US012795711B2

(12) United States Patent
Xie et al.

(10) Patent No.: US 12,795,711 B2
(45) Date of Patent: Nov. 10, 2026

(54) INTER-SUBSCRIPTION DL INTERFERENCE CANCELATION

(71) Applicant: QUALCOMM Incorporated, San Diego, CA (US)

(72) Inventors: Ling Xie, Beijing (CN); Zhanyi Liu, Beijing (CN); Liang Hong, Beijing (CN); Zhenyu Liu, Beijing (CN); Lan Lan, San Diego, CA (US); Qingxin Chen, San Diego, CA (US); Cheol Hee Park, San Diego, CA (US); Kandarpkumar Patel, San Diego, CA (US); Aiping Zhang, Poway, CA (US); Ammar Kitabi, San Diego, CA (US); Ning Zhao, Beijing (CN); Anindya Majumder, San Diego, CA (US); Louis Benavidez, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 18/846,247

(22) PCT Filed: May 13, 2022

(86) PCT No.: PCT/CN2022/092664

§ 371 (c)(1),
(2) Date: Sep. 11, 2024

(87) PCT Pub. No.: WO2023/216228

PCT Pub. Date: Nov. 16, 2023

(65) Prior Publication Data

US 2025/0254715 A1 Aug. 7, 2025

(51) Int. Cl.
*H04W 72/541* (2023.01)
*H04W 72/1273* (2023.01)

(52) U.S. Cl.
CPC ..... *H04W 72/541* (2023.01); *H04W 72/1273* (2013.01)

(58) Field of Classification Search
CPC ... H04B 1/10; H04W 72/1273; H04W 72/541
See application file for complete search history.

(56) References Cited

U.S. PATENT DOCUMENTS

2014/0146765 A1 5/2014 Ji et al.
2015/0078190 A1 * 3/2015 Cheng ..................... H04L 27/00 370/252

(Continued)

FOREIGN PATENT DOCUMENTS

CN 110391887 A 10/2019
WO 2015077957 A1 6/2015

OTHER PUBLICATIONS

Huawei, et al., "Discussion on PDSCH Performance Requirements for Multi-DCI Based Multi TRP Transmission", 3GPP TSG-RAN WG4 Meeting #94Bis-e, R4-2003685, Apr. 20-30, 2020, 4 Pages, Section 2, The Whole Document.

(Continued)

*Primary Examiner* — Ricky Q Ngo
(74) *Attorney, Agent, or Firm* — Procopio, Cory, Hargreaves & Savitch

(57) ABSTRACT

A UE may be configured to receive a first DL scheduling information of a first set of REs for a first subscription and a second DL scheduling information of a second set of REs for a second subscription, at least a part of the first set of REs overlapping with the second set of REs, the first subscription and the second subscription being included in a plurality of subscriptions between the UE and a network, and perform an interference cancelation for the first set of REs based at least in part on the second DL scheduling information.

30 Claims, 14 Drawing Sheets

(56) References Cited

U.S. PATENT DOCUMENTS

| | | | | |
|---|---|---|---|---|
| 2016/0072531 | A1* | 3/2016 | Abrishamkar | G05B 13/027 455/65 |
| 2019/0158239 | A1* | 5/2019 | Chen | H04W 72/0473 |
| 2022/0183015 | A1* | 6/2022 | Jang | H04L 5/0007 |
| 2023/0328720 | A1* | 10/2023 | Padaki | H04L 5/0051 370/329 |

OTHER PUBLICATIONS

International Search Report and Written Opinion—PCT/CN2022/092664—ISA/CN—Dec. 23, 2022.

* cited by examiner

INTER-SUBSCRIPTION DL INTERFERENCE CANCELATION

CROSS REFERENCE TO RELATED APPLICATION(S)

This application is a National Stage Application filed under 35 U.S.C. § 371 of PCT International Application No. PCT/CN2022/092664, entitled "INTER-SUBSCRIPTION DL INTERFERENCE CANCELATION" and filed May 13, 2022, which is expressly incorporated by reference herein in its entirety.

TECHNICAL FIELD

The present disclosure relates generally to communication systems, and more particularly, to a method of wireless communication including inter-subscription downlink (DL) interference cancelation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE), and the UE may be configured to receive first downlink (DL) scheduling information of a first set of resource elements (REs) for a first subscription and second DL scheduling information of a second set of REs for a second subscription, at least a part of the first set of REs overlapping with the second set of REs, the first subscription and the second subscription being included in a plurality of subscriptions between the UE and a network, and perform an interference cancelation for the first set of REs based at least in part on the second DL scheduling information.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
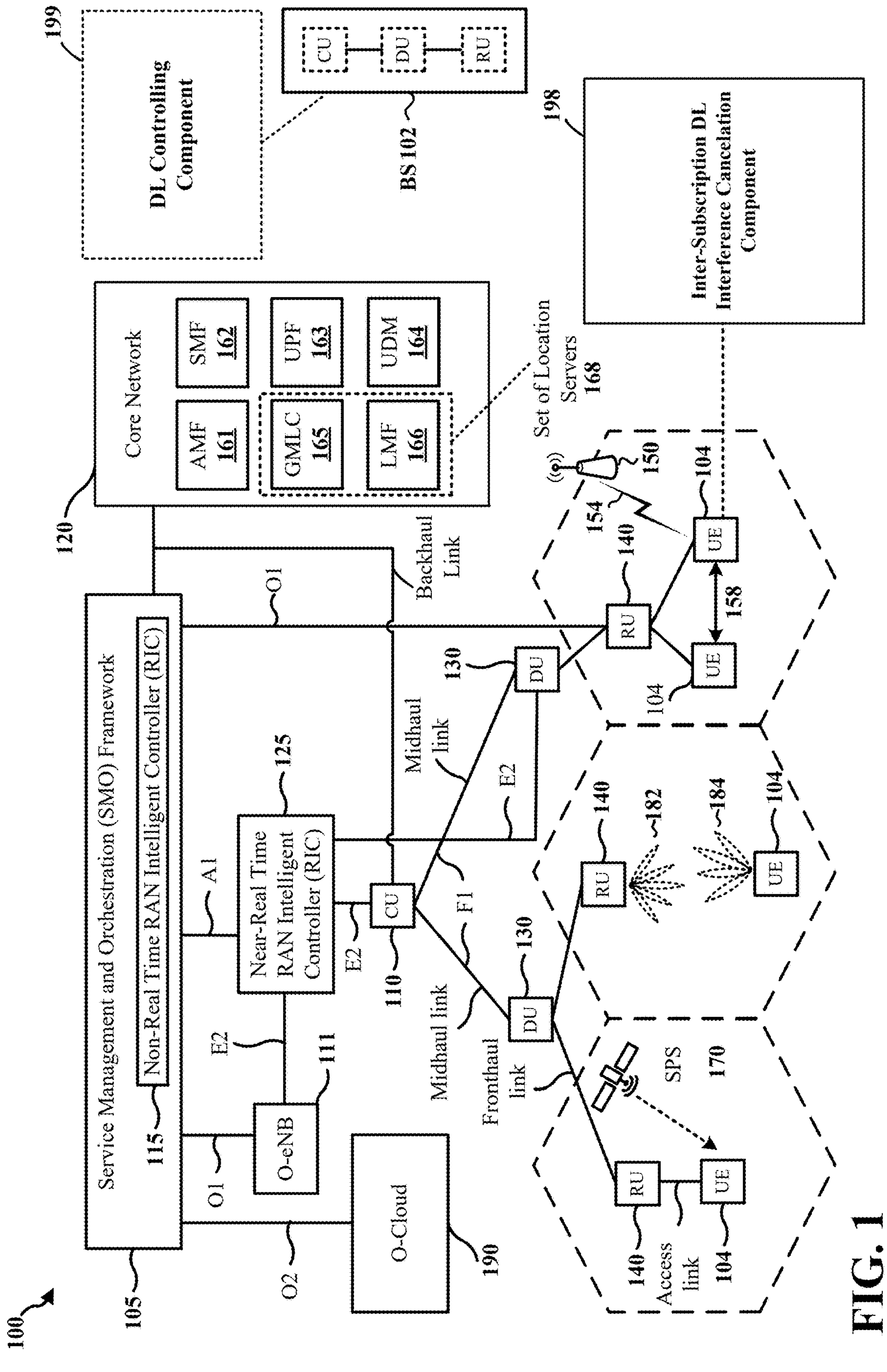
FIG. 1 is a diagram illustrating an example of a wireless communications system and an access network.

A multi-subscriber identity module (SIM) (MSIM) device may support concurrent network activities of two subscriptions on the device. If the two cells associated with the two subscriptions are the same radio access technology (RAT), the DL resources scheduled for the two subscriptions may overlap in a time-frequency domain and, therefore, act as interference signals to each other. In some aspects of the current disclosure, the UE may perform interference cancelation based on the scheduling information or configurations of the REs scheduled for the two subscriptions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or more multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term “sub-6 GHz” or the like if used herein may broadly represent frequencies that may be less than 6 GHz, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an inter-subscription DL interference cancelation component 198 configured to receive first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE and a network, and perform an interference cancelation for the first set of REs based at least in part on the second DL scheduling information. In certain aspects, the base station 102 may include a DL controlling component 199 configured to transmit first DL scheduling information of a first set of REs for a first subscription for a UE, the first subscription being included in a plurality of subscriptions between the UE and a network transmit a first set of DL TBs for the UE on the first subscription and receive an indication of an interference cancelation performed for the first set of REs based at least in part on second DL scheduling information of a second set of REs for a second subscription received at the UE, at least a part of the first set of REs overlapping with the second set of REs. Although the following description may be focused on 5G NR, the concepts described herein may be applicable to other similar areas, such as LTE, LTE-A, CDMA, GSM, and other wireless technologies.

Figure 2A:
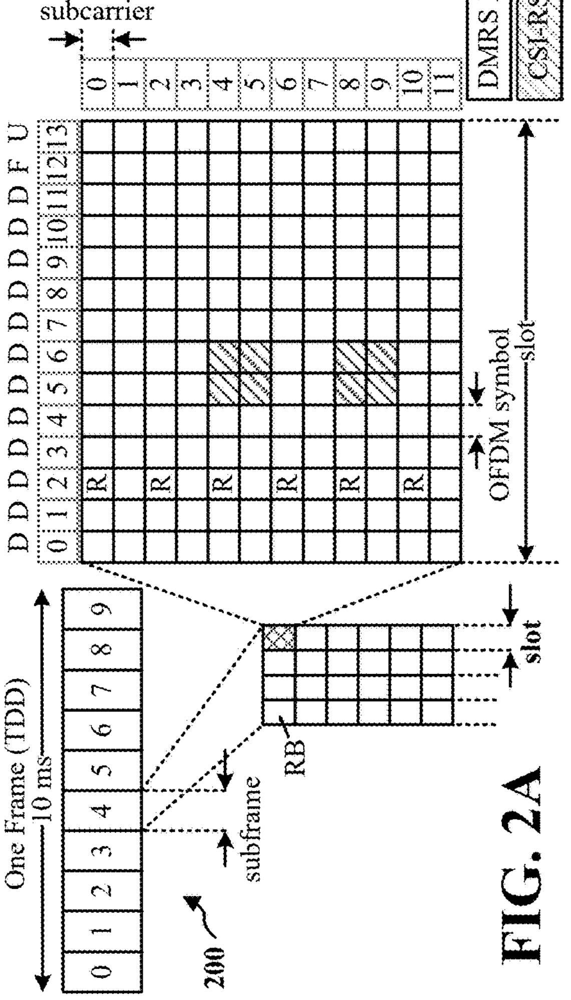
FIG. 2A is a diagram illustrating an example of a first frame, in accordance with various aspects of the present disclosure.
Figure 2B:
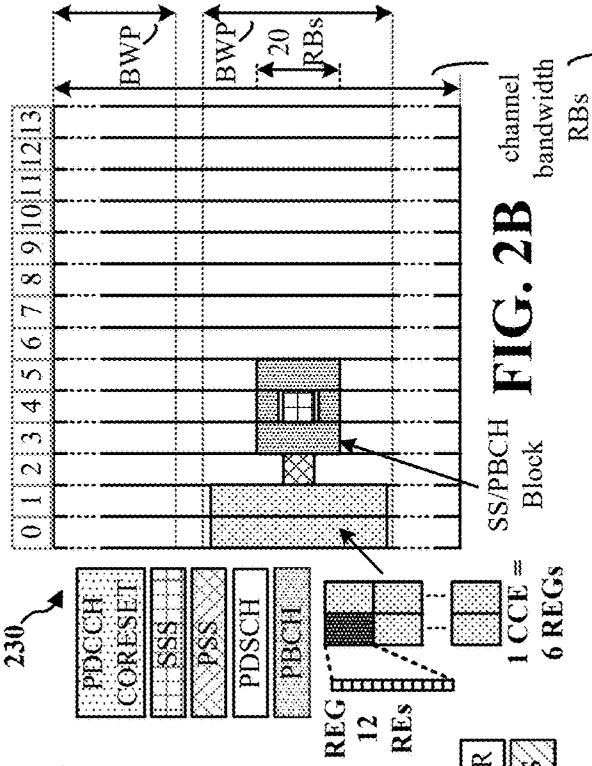
FIG. 2B is a diagram illustrating an example of DL channels within a subframe, in accordance with various aspects of the present disclosure.
Figure 2C:
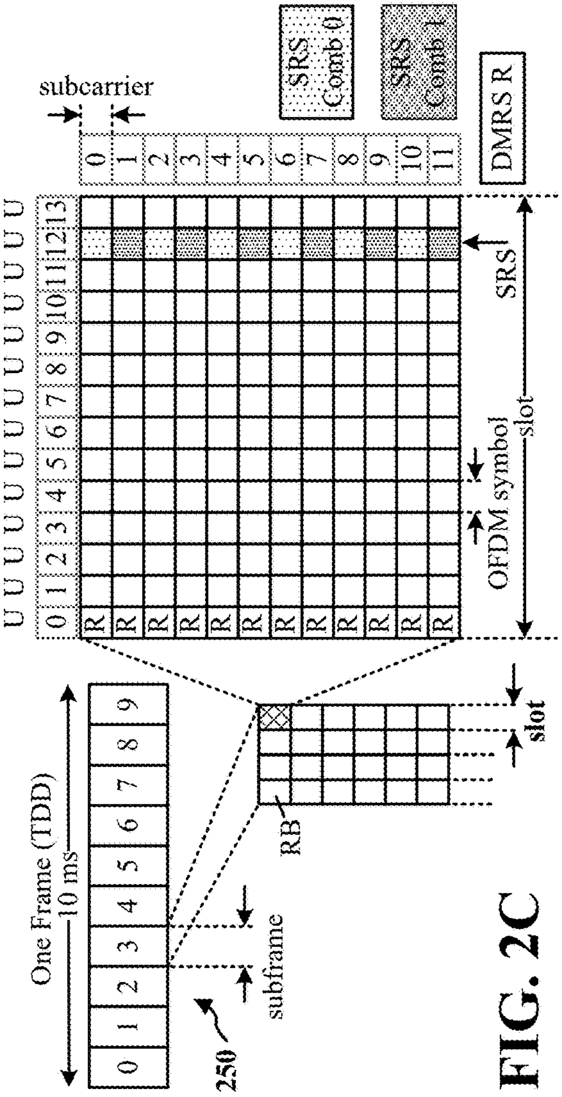
FIG. 2C is a diagram illustrating an example of a second frame, in accordance with various aspects of the present disclosure.
Figure 2D:
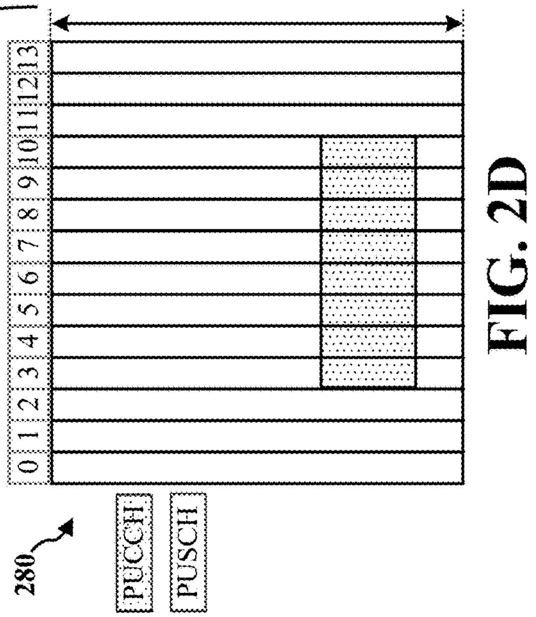
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology p=4 has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
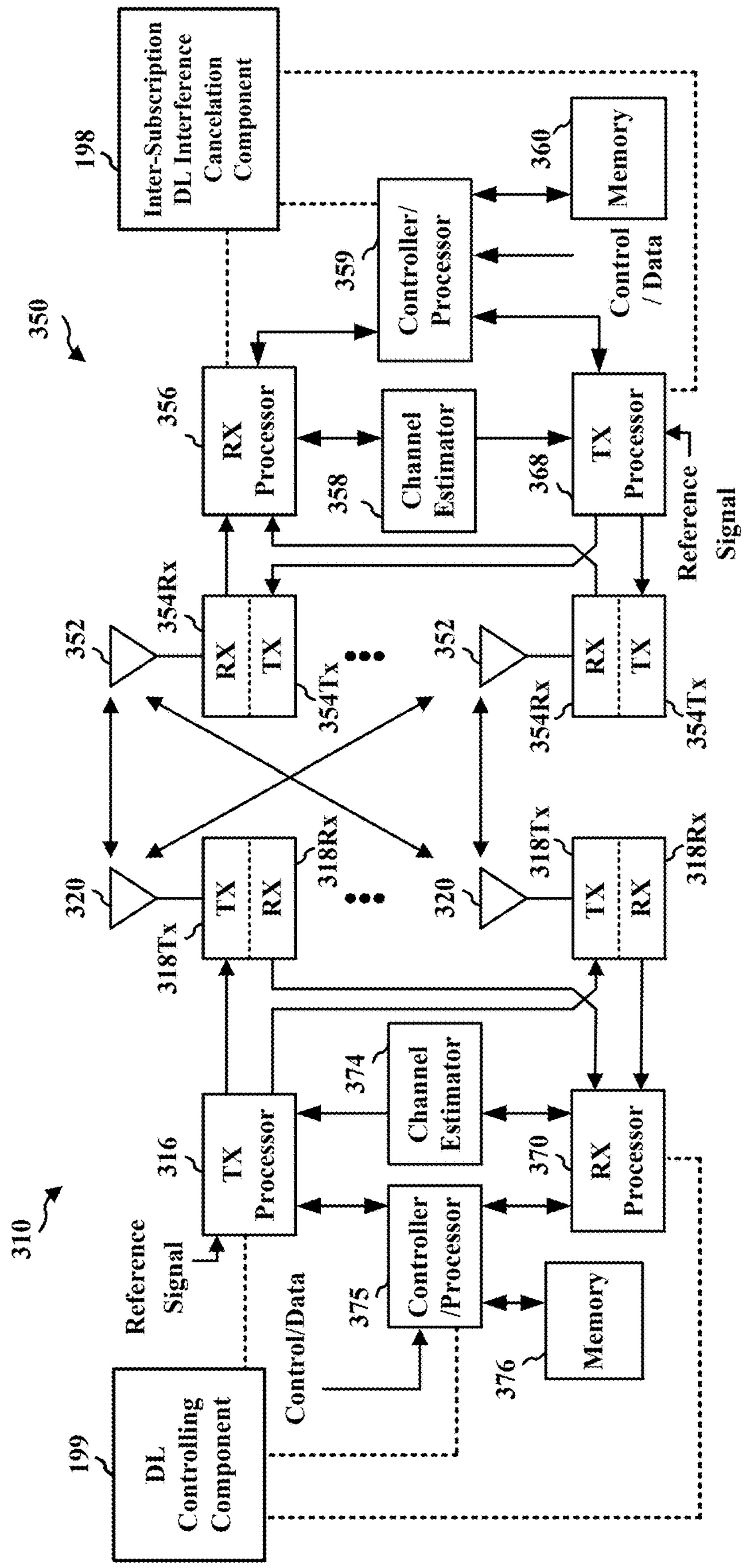
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the inter-subscription DL interference cancelation component 198 of FIG. 1. At least one of the TX processor 316, the RX processor 370, and the controller/processor 375 may be configured to perform aspects in connection with the DL controlling component 199 of FIG. 1.

Figure 4:
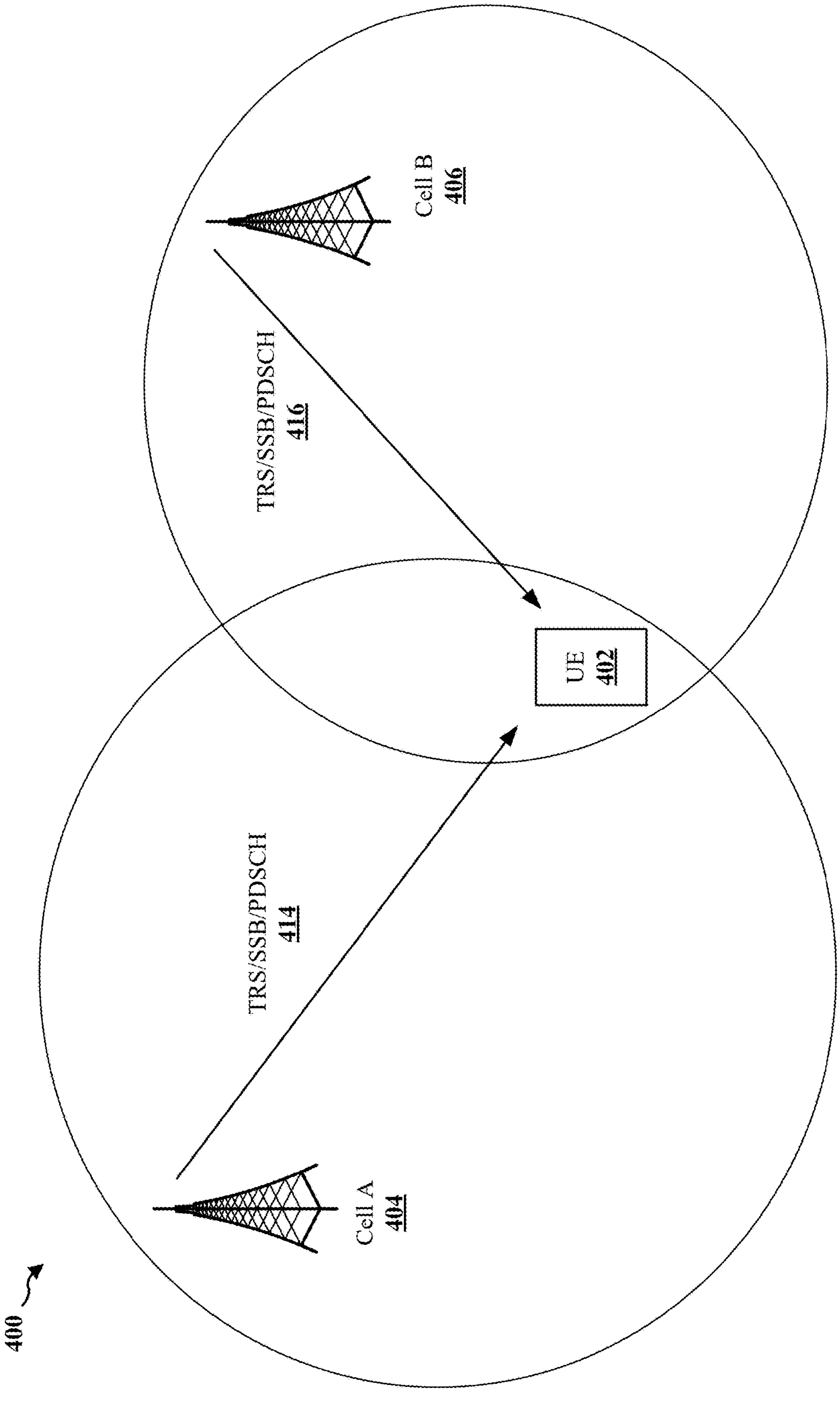
FIG. 4 is a diagram of wireless communication including a UE connected to multiple subscriptions.

FIG. 4 is a diagram 400 of wireless communication, including a UE 402 connected to multiple subscriptions. In some aspects, a UE 402 may be configured to communicate with at least one network node. The UE 402 may be configured to support a multi-subscriber identity module (SIM) (MSIM) mode, such as a dual SIM dual active (DSDA) mode, in which the UE 402 is connected to the network via a first subscription (SUB-1) based on a first SIM and a second subscription (SUB-2) based on a second SIM. The DSDA device may support concurrent network activities of the two subscriptions on the same device. That is, the UE 402 that may support the DSDA may support concurrent activities on the two subscriptions, e.g., the SUB-1 and the SUB-2. The UE 402 that may support the DSDA may transmit, receive, or monitor for communication that overlaps in time at the same time. In some aspects, the transmission, reception, or monitoring that overlaps at least partially in time may be referred to as occurring simultaneously. The device may include multiple antennas and transceivers, such as two antennas/transceivers, which enable communication to be transmitted and received by both subscriptions in an overlapping manner.

In some aspects, the two subscriptions, e.g., the SUB-1 and the SUB-2, may be in the same RRC state or in different RRC states. In one aspect, both the SUB-1 and the SUB-2 may be in the same RRC state. In one example, both the SUB-1 and the SUB-2 may be in the RRC idle state. In another example, both the SUB-1 and the SUB-2 may be in the RRC connected state. In another aspect, the SUB-1 and the SUB-2 of the UE 402 may be in different RRC states. In one example, the SUB-1 may be in the RRC connected state, and the other SUB-2 may be in the RRC idle state. In another example, the SUB-1 may be in the RRC idle state, and the other SUB-2 may be in the RRC connected state.

In one aspect, the two subscriptions, e.g., the SUB-1 and the SUB-2, may be in the RRC connected state and camped on (e.g., registered to) different cells; cell A 404 and cell B 406. That is, the first subscription SUB-1 may be camped on the cell A 404 and the second subscription SUB-2 may be camped on the cell B 406, and the SUB-1 may be connected to the network via the cell A 404, and the SUB-2 may be connected to the network via the cell B 406.

To provide the wireless connection to the UE 402, the cell A 404 and the cell B 406 may independently transmit reference signals (RSs) (e.g., tracking RS (TRS), SSB, etc.) or schedule UL/DL REs in the time-frequency domain for the UE 402 to communicate the UL/DL channels (e.g., PDSCH) including UL/DL data. That is, the cell A 402 may transmit the RSs (e.g., TRS, SSB, etc.) or schedule a first set of REs 414 for UL/DL channels for the SUB-1 of the UE 402, and the cell B 406 may transmit the RSs (e.g., TRS, SSB, etc.) schedule a second set of REs for UL/DL channels 416 for the SUB-2 of the UE 402. Here, the first set of REs and the second set of REs are independently scheduled by cell A 404 and cell B 406, respectively, and at least a part of the first set of REs and the second set of REs may overlap with each other, e.g., in the same in the time-frequency domain.

In one aspect, the first signal from the cell A 404 may be interfered by the second signal from the cell B 406. That is, from the perspective of the cell A 404, the signal from the cell B 406 may be interference. In one example, the UE 402 may be located near a boundary of cell A, and the interference caused by the signal from the cell B 406 may have a relatively greater effect. Various implementation of interference cancelation algorithms may be used to improve the performance by mitigating the interference caused by the signals from other cells.

In the case of the DSDA device, the two subscriptions camping on different cells may act as interference to each other. That is, the first signal from the cell A 404 may be affected by a second signal from the cell B 406, and the first signal from the cell A 404 may affect the second signal from the cell B 406. From the perspective of the SUB-1, the first signal on the cell A 404, including the UL/DL channel, may be interfered with by the second signal from cell B 406.

As proffered, the cell A 404 and the cell B 406 may independently schedule UL/DL REs in the time-frequency domain for the UE 402 to communicate the UL/DL channels, including UL/DL data. That is, the cell A 402 may schedule the first set of REs for UL/DL channels for the SUB-1 of the UE 402, and the cell B 406 may schedule a second set of REs for UL/DL channels for the SUB-2 of the UE 402. Accordingly, at least a part of the first set of REs and the second set of REs independently scheduled by cell A 404 and cell B 406, respectively, may overlap with each other, e.g., in the same time-frequency domain. Because of the physical resources (e.g., in the frequency-time domain) overlapped, each SUB, e.g., the SUB-1 and the SUB-2, may suffer interference from the serving cells of the other subscription, e.g., the cell A 404 and the cell B 406.

Figure 5:
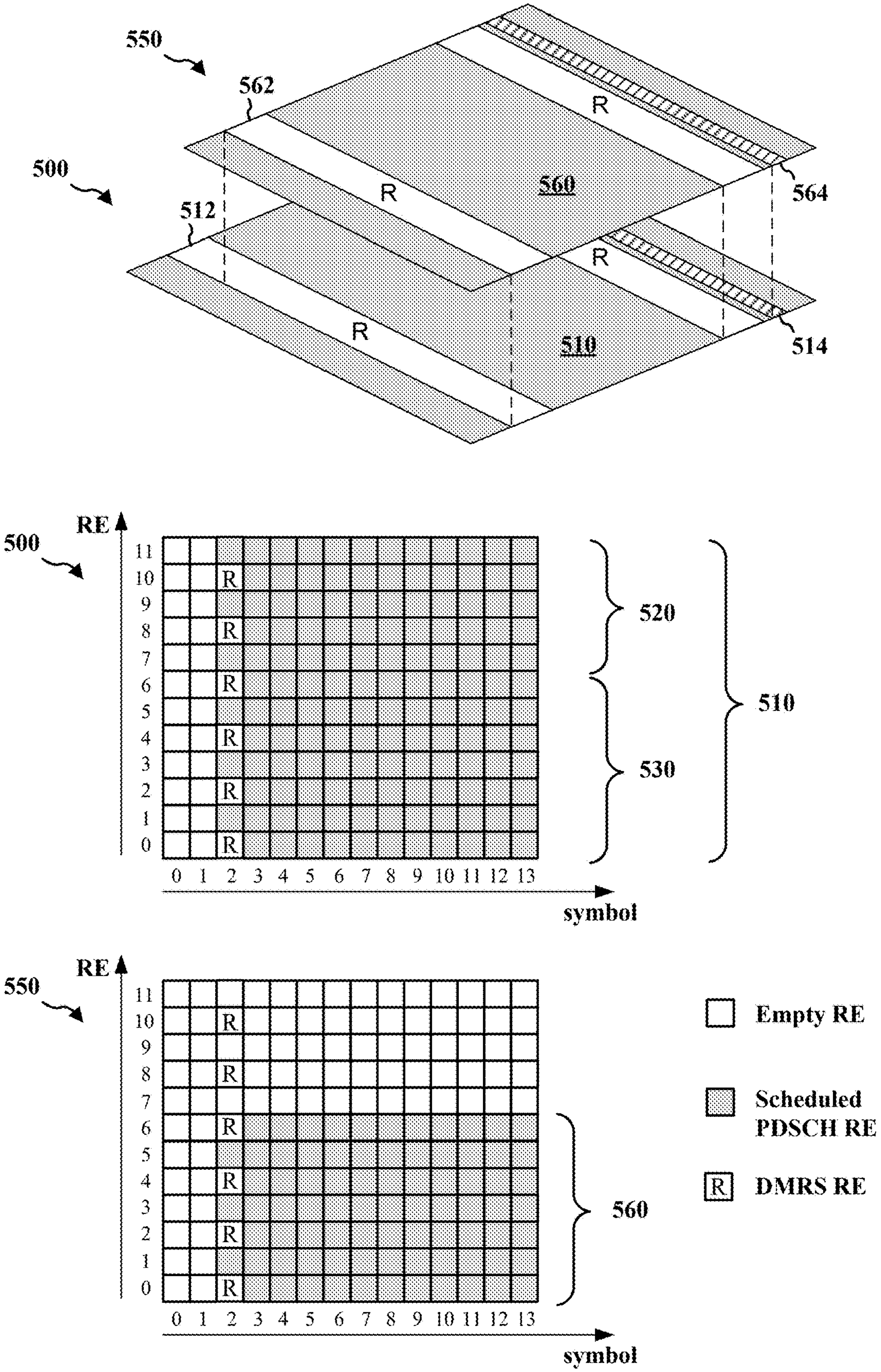
FIG. 5 illustrates two sets of DL resources with overlapping scheduling.

FIG. 5 illustrates two sets of DL resources with overlapping scheduling. Here, each a first set of REs 500 and a second set of REs 550 may be scheduled for DL communication of a DSDA device (e.g., the UE 402), connected to the network through a first subscription on a first cell and a second subscription on a second cell, and include a DMRS 512 and 562, TRS 514 and 564, and PDSCH 510 and 560. In some aspects, FIG. 5 includes the first set of REs 500 scheduled for DL communication on the first cell (e.g., cell A 404) and the second set of REs 550 scheduled for DL communication on the second cell (e.g., cell B 406). That is, the MSIM UE device associated with two subscriptions, e.g., the SUB-1 and the SUB-2, camping on different cells, e.g., cell A 404 and cell B 406, and may be in an RRC connected state. In one aspect, the first cell associated with the first subscription and the second cell associated with the second subscription may be the same radio access technology (RAT), and therefore, the sets of REs for DL communications independently scheduled on the two subscriptions may have overlapping frequency resource and slots in the time-frequency domain.

The UE may be a DSDA device, and the two subscriptions, e.g., the SUB-1 and the SUB-2, of the UE may be scheduled at the same physical location but may camp on different cells. That is, at least a part of the first set of REs 500 may overlap with the second set of REs 550 in the time-frequency domain. Accordingly, each subscription of the SUB-1 and the SUB-2 may suffer interference from the scheduled DL communication on the other SUB's serving cell. Here, the first subset of REs 520 of the first set of REs 510 does not overlap with the second set of REs 550, and the second subset of REs 530 of the first set of REs 510 overlaps with the second set of REs 550.

Here, the UE may be a DSDA device, and the UE may receive the DL scheduling information and configurations of both the first set of REs 500 and the second set of REs 550. That is, the first cell (e.g., the cell A 404) may transmit a first DL scheduling information and configuration of the first set of REs 500 to the UE, and the second cell (e.g., cell B 406) may transmit second DL scheduling information and configuration of the second set of REs 550. Different from a single UE device, the two subscriptions, e.g., the SUB-1 and the SUB-2, on the same device may provide for the UE to share the scheduling information and configurations with each other, which may help the interference cancelation to be more accurate. That is, the UE, which is a DSDA device, may receive the first scheduling information and configuration of the first set of REs on the first cell associated with the first subscription and the second scheduling information and configuration of the second set of REs on the second cell associated with the second subscription, and identify the overlapping REs between the first set of REs and the second set of REs, and perform the interference cancelation based at least in part on the first scheduling information and configuration and the second scheduling information and configuration.

In some aspects, the UE may first perform a resource overlapping detection based on both SUB scheduling information if two subscriptions, e.g., the SUB-1 and the SUB-2, are the same RAT. For example, the SUB-1 and the SUB-2 may be both LTE or 5G NR. The UE may first detect that the two subscriptions, e.g., the SUB-1 and the SUB-2, are the same RAT and understand that the scheduling on the two subscriptions may overlap with each other in the time-frequency domain based on detecting that the two subscriptions, e.g., the SUB-1 and the SUB-2, are the same RAT.

Based on the first scheduling information and configuration for the SUB-1 and the second scheduling information and configuration for the SUB-2, the UE may perform the various implementation of interference cancelation with relatively higher accuracy. Here, the interference cancelation may be based on a configuration or scheduled resources of at least one of the TRS, the SSB, the DMRS, or the PDSCH of the interfering signal. In one example, the UE may perform the interference cancelation procedure on the first set of REs 500 based on the configuration or the scheduled resources of at least one of the TRS 564, SSB, DMRS 562, or the PDSCH 560 of the second set of REs 550 received for the second subscription (e.g., SUB-2). In another example, the UE may perform the interference cancelation procedure on the second subset of REs 530 of the first set of REs 500 based on the configuration or the scheduled resources of at least one of the TRS 564, SSB, DMRS 562, or the PDSCH 560 of the second set of REs 550 received for the second subscription (e.g., SUB-2).

Figure 6:
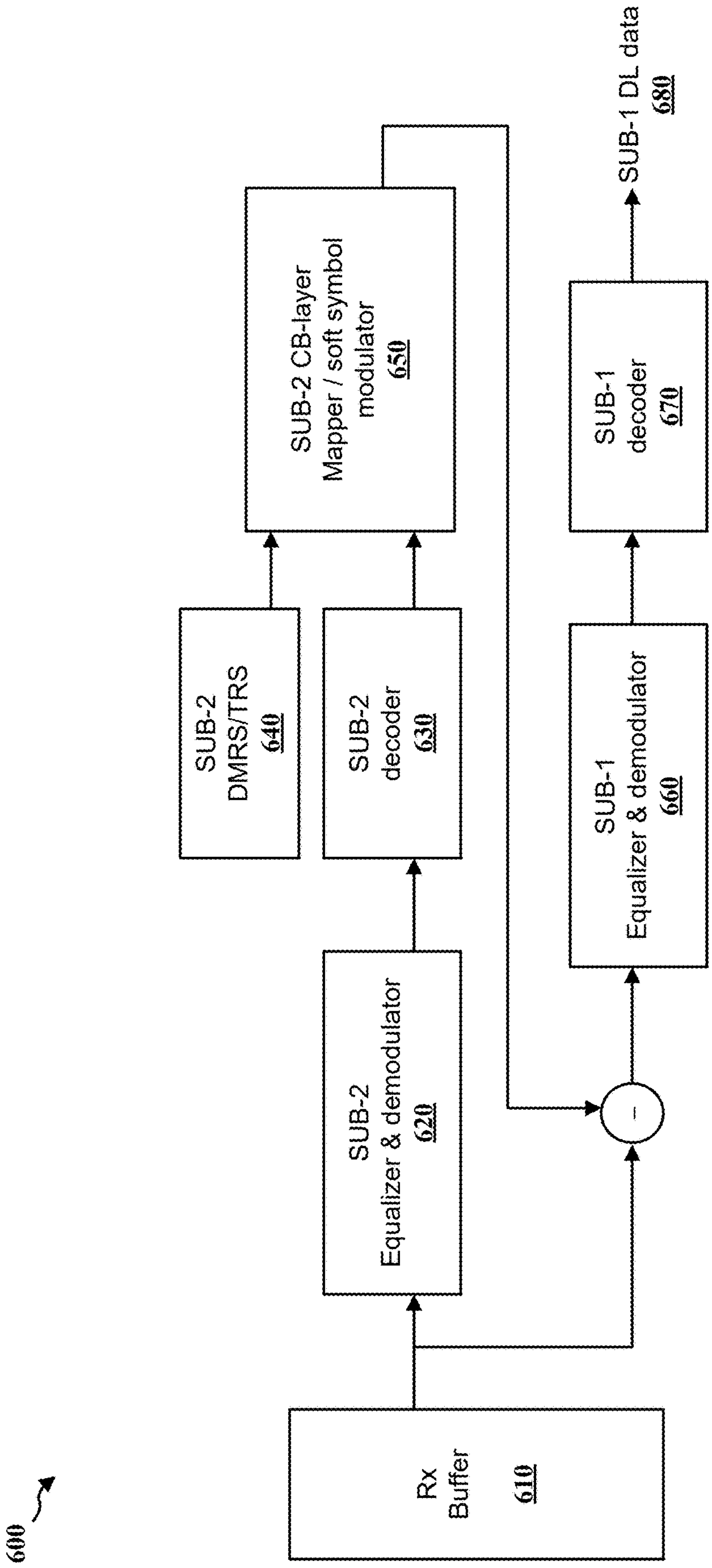
FIG. 6 illustrates an example of DL interference cancelation of a method of wireless communication.

FIG. 6 illustrates an example of DL interference cancelation 600 of a method of wireless communication. The DL interference cancelation 600 may be performed at a UE with a DSDA support, with a first subscription (e.g., SUB-1) on a first cell (e.g., cell A 404) and a second subscription (e.g., SUB-2) on a second cell (e.g., cell B 406). The UE may first detect that the SUB-1 and the SUB-2 are on the same RAT.

In some aspects, the UE may detect that at least a part of the first set of DL resources for the SUB-1 and the second set of DL resources for the SUB-2 are scheduled to overlap in the time-frequency domain. In one aspect, the UE may preliminarily determine that at least part of the first set of DL resources of the SUB-1 and the second set of DL resources of the SUB-2 may overlap with each other based on detecting that RS resources overlap each other. Here, the RS may include at least one of the DMRS, the TRS, etc. The UE may detect that at least a part of the first RS resources of the first set of DL resources for the SUB-1 overlaps with the second RS resources of the second set of DL resources for the SUB-2 and determine that at least a part of the first RS resources of the first set of DL resources for the SUB-1 may overlap with the second RS resources of the second set of DL resources for the SUB-2. The UE may detect that the at least a part of the first RS resources of the first set of DL resources for the SUB-1 overlaps with the second RS resources of the second set of DL resources for the SUB-2 based on configurations of the first RS resources and the second RS resources, the configurations including at least one of a type, ports, scrambling IDs, and time slots scheduled.

Based on detecting that at least a part of the first RS resources of the first set of DL resources for the SUB-1 overlaps with the second RS resources of the second set of DL resources for the SUB-2, the UE may perform the overlapping detection. The overlapping detection may be based on the two DL scheduling information of the SUB-1 and the SUB-2 at the same slot. If the UE determines that any of the DL resources scheduled for the SUB-1 and the SUB-2 overlap, the UE may determine that the corresponding slot is an overlapped slot. If the UE detects the overlapped slot, the SUB-1 of the UE may trigger the overlapping detection-based interference cancelation.

In some aspects, the UE may first receive TBs, including a first set of DL TBs on the SUB-1 and the second set of DL TBs on the SUB-2, and the received TBs may be stored in a receive (Rx) buffer 610. In one aspect, for the SUB-1 to perform the interference cancelation on the first set of DL TBs received on the SUB-1, the UE may reconstruct the effect of interference caused by the second cell (e.g., the cell B 406) based on the SUB-2 signal received on the second cell. The SUB-2 may preliminarily decode the second set of DL TBs by using the SUB-2 equalizer and demodulator 620 and the SUB-2 decoder 630. The decoded SUB-2 signal may be applied to a SUB-2 configured grant (CG) layer mapper/soft symbol modulator 650, with the SUB-2 RS 640, e.g., the SUB-2 DMRS 562 or TRS 564. The SUB-2 CG-layer mapper/soft symbol modulator 650 may receive the decoded SUB-2 signal from the SUB-2 decoder 630 and the SUB-2 RS 640 and generate a reconstructed SUB-2 signal which may represent the interference caused by the first set of DL REs on the SUB-1. The SUB-1 may cancel the interferences caused by the SUB-2 DL REs by reducing the first set of DL TBs stored in the Rx buffer 610 by the reconstructed SUB-2 signal. The SUB-1 may generate the SUB-1 DL data 680 by decoding the first set of DL TBs reduced by the reconstructed SUB-2 signal by using the SUB-1 equalizer and demodulator 660 and the SUB-1 decoder 670.

In another aspect, for the SUB-2 to perform the interference cancelation on the second set of DL TBs received on the SUB-2, the UE may reconstruct the effect of interference caused by the first cell (e.g., the cell A 404) based on the SUB-1 signal received on the first cell. The SUB-1 may preliminarily decode the first set of DL TBs by using the SUB-1 equalize and demodulator and the SUB-1 decoder. The decoded SUB-1 signal may be applied to a SUB-1 CG layer mapper/soft symbol modulator with the SUB-1 RS, e.g., the SUB-1 DMRS 512 or SUB-1 TRS 514. The SUB-1 CG-layer mapper/soft symbol modulator may receive the reconstructed SUB-1 signal and the SUB-1 RS and generate a reconstructed SUB-1 signal which may represent the interference caused by the first set of DL REs on the SUB-2. The SUB-2 may cancel the interferences caused by the SUB-1 DL REs by reducing the second set of DL TBs stored in the Rx buffer by the reconstructed SUB-1 signal. The SUB-2 may decode the first set of DL TBs reduced by the reconstructed SUB-1 signal by using the SUB-2 equalize and demodulator and the SUB-2 decoder.

Figure 7:
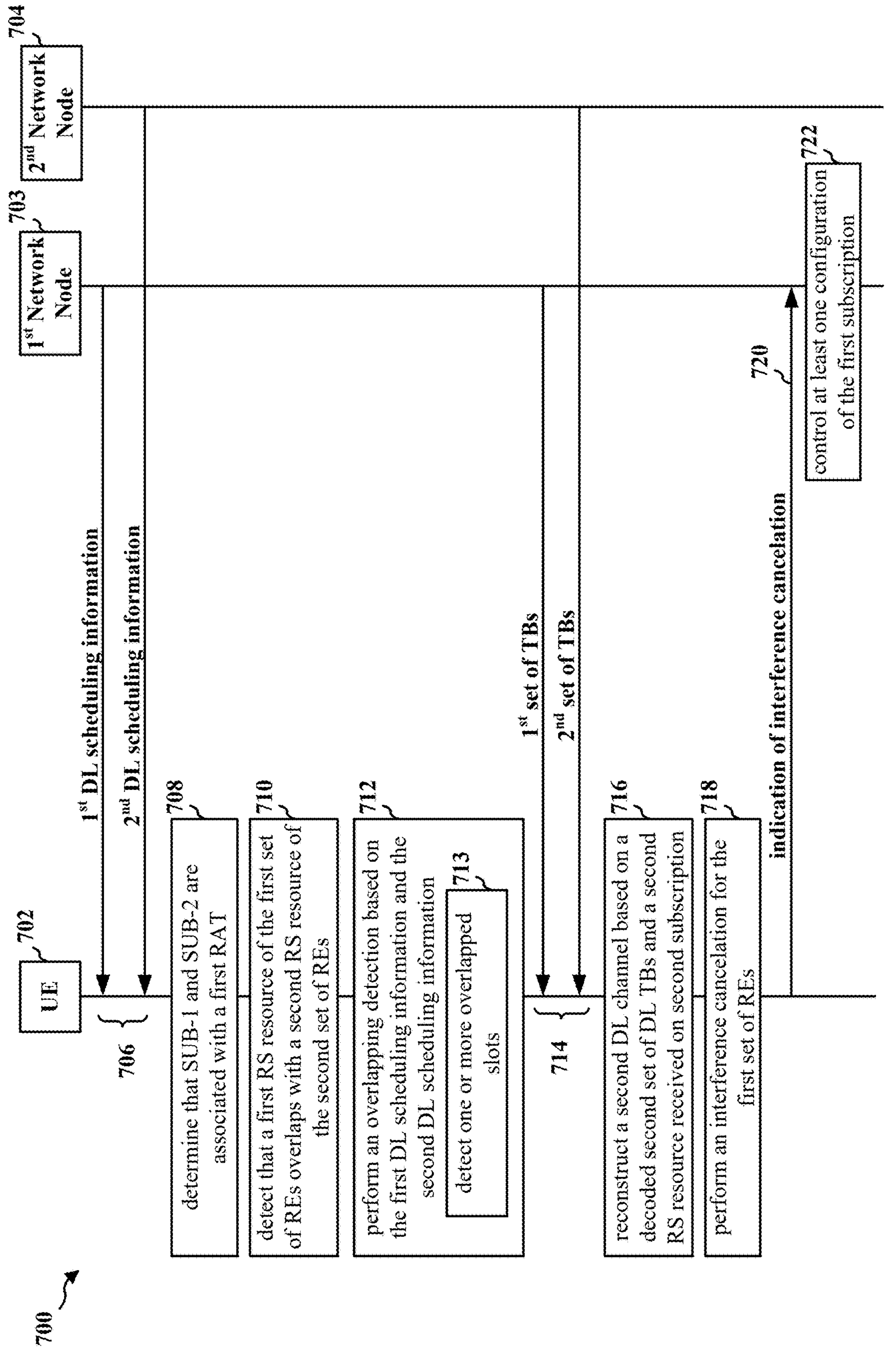
FIG. 7 is a call-flow diagram of a method of wireless communication.

FIG. 7 is a call-flow diagram 700 of a method of wireless communication. The call-flow diagram 700 may include a UE 702, a first network node 703, and a second network node 704. The UE 702 may be a DSDA device that may support concurrent network activities of two subscriptions on the UE 702, and the two subscriptions may include a first subscription (e.g., SUB-1) and a second subscription (e.g., SUB-2), where the first subscription may be associated with a first cell (cell A 404) provided by the first network node 703 and the second subscription may be associated with a second cell (e.g., the cell B 406) provided by the second network node 704. The UE 702 may indicate the interference cancelation for the first set of REs to the first network node 703, and the network node 703 may control at least one configuration of the first subscription (e.g., SUB-1).

At 706, the UE 702 may receive first DL scheduling information of the first set of REs for a first subscription and second DL scheduling information of the second set of REs for a second subscription, at least a part of the first set of REs overlapping with the second set of REs, the first subscription and the second subscription being included in a plurality of subscriptions between the UE 702 and a network. Here, the network may include the first network node 703 and the second network node 704. In one aspect, the first subscription and the second subscription may be associated with an RRC connected state. In another aspect, the first subscription and the second subscription may be at the same physical location, and the first subscription is camped at the first cell provided by the first network node 703, and the second subscription is camped at a second cell provided by the second network node 704, where the first cell is different from the first cell.

Here, each DL scheduling information of the corresponding set of REs may include type, ports, a scrambling ID of the corresponding RS resource, or a set of time slots scheduled for the corresponding DL transmission on the corresponding subscription. That is, the first DL scheduling information may include at least one of a first type, one or more first ports, a scrambling ID of the first RS resource, or the first set of time slots scheduled for a DL transmission on the first subscription, and the second DL scheduling information may include at least one of a second type, one or more second ports, a scrambling ID of the second RS resource, or the second set of time slots scheduled for the DL transmission on the first subscription.

At 708, the UE 702 may determine that the first subscription is associated with a first RAT, and the second subscription is associated with the first RAT. Here, the UE 702 may first detect that the two subscriptions, e.g., the SUB-1 and the SUB-2, are the same RAT and understand that the scheduling on the two subscriptions may overlap with each other in the time-frequency domain, based on detecting that the two subscriptions, e.g., the SUB-1 and the SUB-2, are the same RAT. In one aspect, based on detecting that the two subscriptions, e.g., the SUB-1 and the SUB-2, are the same RAT, the UE 702 may detect whether a first RS resource of the first set of REs overlaps with a second RS resource of the first set of REs at 710.

At 710, the UE 702 may detect that the first RS (e.g., DMRS, TRS, etc.) resource of the first set of REs overlaps with the second RS resource of the second set of REs. In one aspect, the first RS resource of the first set of REs overlapping the second RS resource of the second set of REs may be detected based on determining that the two subscriptions, e.g., the SUB-1 and the SUB-2, are the same RAT at 708.

At 712, the UE 702 may perform an overlapping detection based on the first DL scheduling information and the second DL scheduling information to detect that at least a portion of the first set of REs is overlapping with the second set of REs in a time domain or a frequency domain. In one aspect, the first RS resource overlapping with the second RS resource is detected based on determining that the first subscription is associated with the first RAT and the second subscription is associated with the first RAT at 708. In another aspect, the overlapping detection may be performed based on detecting that the first RS resource overlaps with the second RS resource at 710. Here, 712 may include 713.

At 713, at least a portion of the first set of time slots may overlap in time with the second set of time slots, and the UE 702 may detect one or more overlapped slots in which at least the portion of the first set of REs overlaps with the second set of REs. The interference cancelation may be performed based on one or more overlapped slots.

At 714, the UE 702 may receive the first set of DL TBs on the first subscription and the second set of DL TBs on the second subscription. The first set of DL TBs may carry the first set of REs for the first subscription, and the second set of DL TBs may carry the second set of REs for the second subscription.

At 716, the UE 702 may reconstruct a second DL channel based on a decoded second set of DL TBs and a second RS resource received on the second subscription. Here, the reconstructed second DL channel may represent an effect of the interference caused by the second cell on the first set of DL TBs. In one aspect, the second subscription may preliminarily decode the second set of DL TBs (e.g., by using the SUB-2 equalizer and demodulator 620 and the SUB-2 decoder 630), and reconstruct the decoded second DL channel based on the second RS resource (e.g., apply the decoded second DL channel to a SUB-2 configured grant (CG) layer mapper/soft symbol modulator 650, with the SUB-2 RS 640, e.g., the SUB-2 DMRS 562 or TRS 564. The reconstructed second DL channel may represent the interference caused on the first set of DL REs on the SUB-1.

At 718, the UE 702 may perform an interference cancelation for the first set of REs based at least in part on the second DL scheduling information. Here, the interference cancelation for the first set of REs may be performed on the first set of DL TBs based at least in part on the reconstructed second DL channel. That is, the first subscription of the UE 702 may cancel the interferences caused by the second cell by reducing the first set of DL TBs (e.g., stored in the Rx buffer 610) by the reconstructed second DL channel at 716. In one aspect, the interference cancelation may be performed based on detecting that at least the portion of the first set of REs is overlapping with the second set of REs at 712.

At 720, the UE 702 may transmit an indication of the interference cancelation for the first set of REs to the first network node 703 in the network. The first network node 703 may receive an indication of the interference cancelation for the first set of REs from the UE 702. In response to performing the interference cancelation for the first set of REs at 718, the UE 702 may indicate the first network node 703 that the UE 702 performed the interference cancelation for the first set of REs. In one aspect, the indication of the interference cancelation may indicate that at least a part of the first set of REs overlaps with the second set of REs. In another aspect, the indication of the interference cancelation may include at least a part of the second DL scheduling information of the second set of REs for the second subscription received at the UE 702, where the second DL scheduling information includes at least one of a second type, one or more second ports, a scrambling ID of the second RS resource, or a second set of time slots scheduled for the DL transmission on the first subscription.

At 722, the first network node 703 may control at least one configuration of the first subscription based on the indication of the interference cancelation performed for the first set of REs. That is, based on the indication of the interference cancelation for the first set of REs received from the UE 702, the first network node 703 may control or change the at least one configuration of the first subscription. In one aspect, the first network node 703 may control the at least one configuration of the first subscription to reduce the interference caused by the second set of TBs received on the second subscription of the UE 702.

Figure 8:
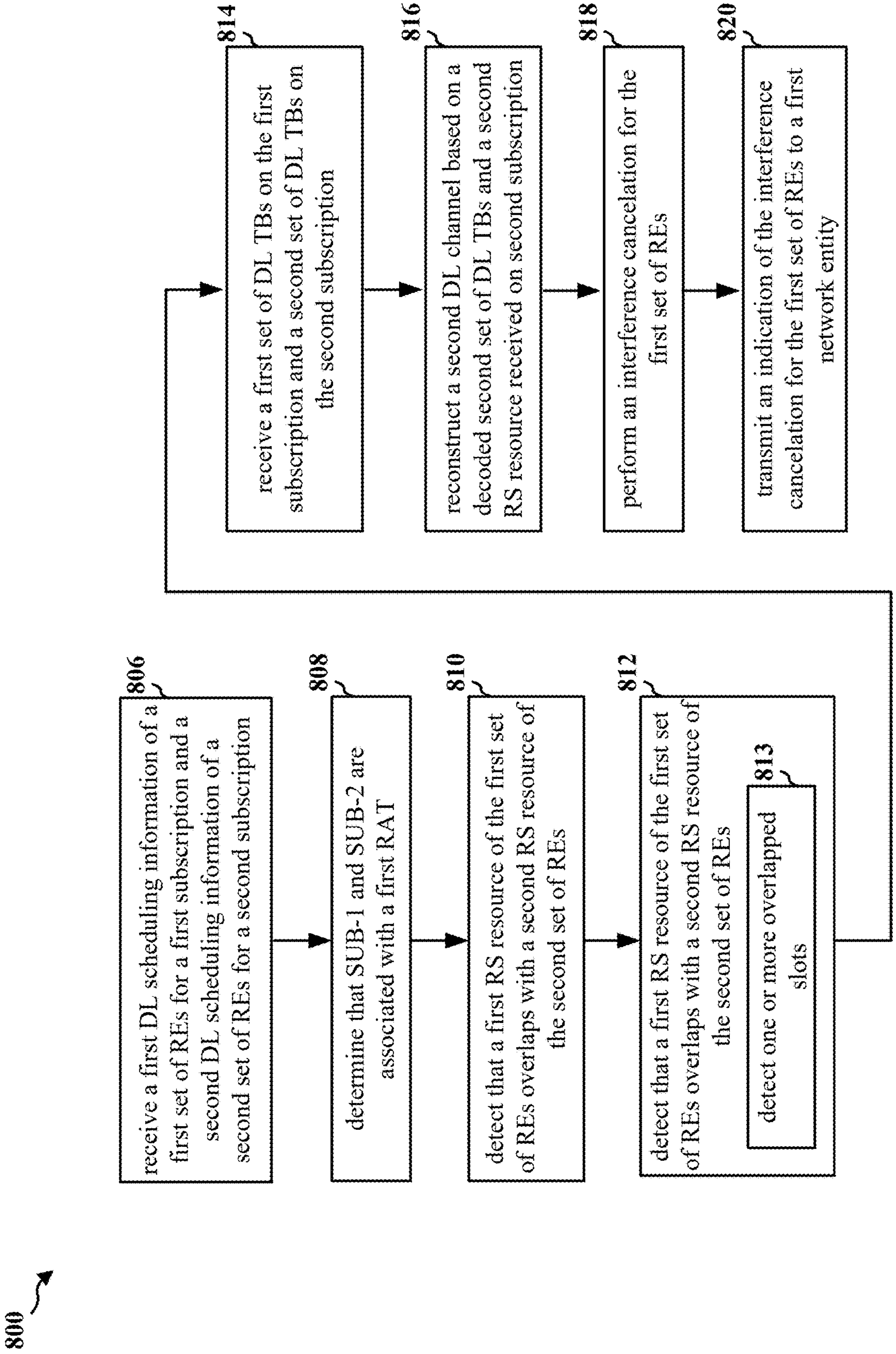
FIG. 8 is a flowchart of a method of wireless communication.

FIG. 8 is a flowchart 800 of a method of wireless communication. The method may be performed by a UE (e.g., the UE 104; the apparatus 1204). The UE may be a DSDA device that may support concurrent network activities of two subscriptions on the UE, and the two subscriptions may include a first subscription (e.g., SUB-1) and a second subscription (e.g., SUB-2), where the first subscription may be associated with a first cell (cell A 404) provided by the first network node and the second subscription may be associated with a second cell (e.g., the cell B 406) provided by the second network node.

At 806, the UE may receive first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE and a network. Here, the network may include the first network node and the second network node. In one aspect, the first subscription and the second subscription may be associated with an RRC connected state. In another aspect, the first subscription and the second subscription may be at the same physical location and the first subscription is camped at the first cell provided by the first network node and the second subscription is camped at a second cell provided by the second network node, where the first cell is different from the first cell. Here, each DL scheduling information of the corresponding set of REs may include type, ports, a scrambling ID of the corresponding RS resource, or a set of time slots scheduled for the corresponding DL transmission on the corresponding subscription. That is, the first DL scheduling information may include at least one of a first type, one or more first ports, a scrambling ID of the first RS resource, or the first set of time slots scheduled for a DL transmission on the first subscription, and the second DL scheduling information may include at least one of a second type, one or more second ports, a scrambling ID of the second RS resource, or the second set of time slots scheduled for the DL transmission on the first subscription. For example, at 706, the UE 702 may receive first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE 702 and a network. Furthermore, 806 may be performed by an inter-subscription DL interference cancelation component 198.

At 808, the UE may determine that the first subscription is associated with a first RAT and the second subscription is associated with the first RAT. Here, the UE may first detect that the two subscriptions, e.g., the SUB-1 and the SUB-2, are the same RAT and understand that the scheduling on the two subscriptions may overlap with each other in the time-frequency domain based on detecting that the two subscriptions, e.g., the SUB-1 and the SUB-2, are the same RAT. In one aspect, based on detecting that the two subscriptions, e.g., the SUB-1 and the SUB-2, are the same RAT, the UE 702 may detect whether a first RS resource of the first set of REs overlaps with a second RS resource of the first set of REs at 810. For example, at 708, the UE 702 may determine that the first subscription is associated with a first RAT and the second subscription is associated with the first RAT. Furthermore, 808 may be performed by the inter-subscription DL interference cancelation component 198.

At 810, the UE may detect that the first RS (e.g., DMRS, TRS, etc.) resource of the first set of REs overlaps with the second RS resource of the second set of REs. In one aspect, the first RS resource of the first set of REs overlapping the second RS resource of the second set of REs may be detected based on determining that the two subscriptions, e.g., the SUB-1 and the SUB-2, are the same RAT at 808. For example, at 710, the UE 702 may detect that the first RS (e.g., DMRS, TRS, etc.) resource of the first set of REs overlaps with the second RS resource of the second set of REs. Furthermore, 810 may be performed by the inter-subscription DL interference cancelation component 198.

At 812, the UE may perform an overlapping detection based on the first DL scheduling information and the second DL scheduling information to detect that at least a portion of the first set of REs is overlapping with the second set of REs in a time domain or a frequency domain. In one aspect, the first RS resource overlapping with the second RS resource is detected based on determining that the first subscription is associated with the first RAT and the second subscription is associated with the first RAT at 808. In another aspect, the overlapping detection may be performed based on detecting that the first RS resource overlaps with the second RS resource at 810. For example, at 712, the UE 702 may perform an overlapping detection based on the first DL scheduling information and the second DL scheduling information to detect that at least a portion of the first set of REs is overlapping with the second set of REs in a time domain or a frequency domain. Furthermore, 812 may be performed by the inter-subscription DL interference cancelation component 198. Here, 812 may include 813.

At 813, at least a portion of the first set of time slots may overlap in time with the second set of time slots, and the UE 702 may detect one or more overlapped slots in which at least the portion of the first set of REs overlaps with the second set of REs. The interference cancelation may be performed based on one or more overlapped slots. For example, at 713, the UE 702 may detect one or more overlapped slots in which at least the portion of the first set of REs overlaps with the second set of REs. Furthermore, 813 may be performed by the inter-subscription DL interference cancelation component 198.

At 814, the UE may receive the first set of DL TBs on the first subscription and the second set of DL TBs on the second subscription. The first set of DL TBs may carry the first set of REs for the first subscription, and the second set of DL TBs may carry the second set of REs for the second subscription. For example, at 714, the UE 702 may receive the first set of DL TBs on the first subscription and the second set of DL TBs on the second subscription. Furthermore, 814 may be performed by the inter-subscription DL interference cancelation component 198.

At 816, the UE may reconstruct a second DL channel based on a decoded second set of DL TBs and a second RS resource received on the second subscription. Here, the reconstructed second DL channel may represent an effect of the interference caused by the second cell on the first set of DL TBs. In one aspect, the second subscription may preliminarily decode the second set of DL TBs (e.g., by using the SUB-2 equalizer and demodulator 620 and the SUB-2 decoder 630) and reconstruct the decoded second DL channel based on the second RS resource (e.g., apply the decoded second DL channel to a SUB-2 configured grant (CG) layer mapper/soft symbol modulator 650, with the SUB-2 RS 640, e.g., the SUB-2 DMRS 562 or TRS 564. The reconstructed second DL channel may represent the interference caused on the first set of DL REs on the SUB-1. For example, at 716, the UE 702 may reconstruct a second DL channel based on a decoded second set of DL TBs and a second RS resource received on the second subscription. Furthermore, 816 may be performed by the inter-subscription DL interference cancelation component 198.

At 818, the UE may perform an interference cancelation for the first set of REs based at least in part on the second DL scheduling information. Here, the interference cancelation for the first set of REs may be performed on the first set of DL TBs based at least in part on the reconstructed second DL channel. That is, the first subscription of the UE may cancel the interferences caused by the second cell by reducing the first set of DL TBs (e.g., stored in the Rx buffer 610) by the reconstructed second DL channel at 816. For example, at 718, the UE 702 may perform an interference cancelation for the first set of REs based at least in part on the second DL scheduling information. Furthermore, 818 may be performed by the inter-subscription DL interference cancelation component 198.

At 820, the UE may transmit an indication of the interference cancelation for the first set of REs to the first network entity in the network. In response to performing the interference cancelation for the first set of REs at 818, the UE may indicate the first network entity that the UE performed the interference cancelation for the first set of REs. In one aspect, the indication of the interference cancelation may indicate that at least a part of the first set of REs overlaps with the second set of REs. In another aspect, the indication of the interference cancelation may include at least a part of the second DL scheduling information of the second set of REs for the second subscription received at the UE 702, where the second DL scheduling information includes at least one of a second type, one or more second ports, a scrambling ID of the second RS resource, or a second set of time slots scheduled for the DL transmission on the first subscription. For example, at 720, the UE 702 may transmit an indication of the interference cancelation for the first set of REs to the first network node 703 in the network. Furthermore, 820 may be performed by the inter-subscription DL interference cancelation component 198.

Figure 9:
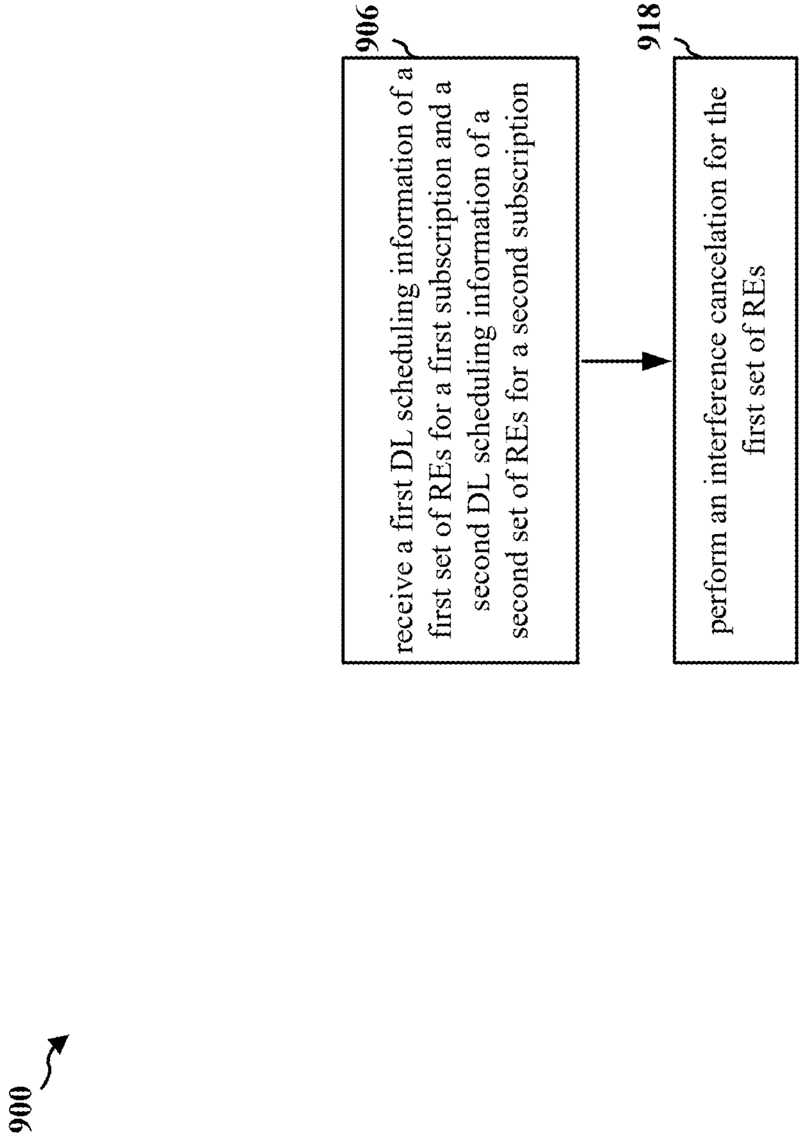
FIG. 9 is a flowchart of a method of wireless communication.

FIG. 9 is a flowchart 900 of a method of wireless communication. The method may be performed by a UE (e.g., the UE 104; the apparatus 1204). The UE may be a DSDA device that may support concurrent network activities of two subscriptions on the UE, and the two subscriptions may include a first subscription (e.g., SUB-1) and a second subscription (e.g., SUB-2), where the first subscription may be associated with a first cell (cell A 404) provided by the first network node and the second subscription may be associated with a second cell (e.g., the cell B 406) provided by the second network node.

At 906, the UE may receive first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE and a network. Here, the network may include the first network node and the second network node. In one aspect, the first subscription and the second subscription may be associated with an RRC connected state. In another aspect, the first subscription and the second subscription may be at the same physical location and the first subscription is camped at the first cell provided by the first network node and the second subscription is camped at a second cell provided by the second network node, where the first cell is different from the first cell. Here, each DL scheduling information of the corresponding set of REs may include type, ports, a scrambling ID of the corresponding RS resource, or a set of time slots scheduled for the corresponding DL transmission on the corresponding subscription. That is, the first DL scheduling information may include at least one of a first type, one or more first ports, a scrambling ID of the first RS resource, or the first set of time slots scheduled for a DL transmission on the first subscription, and the second DL scheduling information may include at least one of a second type, one or more second ports, a scrambling ID of the second RS resource, or the second set of time slots scheduled for the DL transmission on the first subscription. For example, at 706, the UE 702 may receive first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE 702 and a network. Furthermore, 906 may be performed by an inter-subscription DL interference cancelation component 198.

At 918, the UE may perform an interference cancelation for the first set of REs based at least in part on the second DL scheduling information. Here, the interference cancelation for the first set of REs may be performed on the first set of DL TBs based at least in part on the reconstructed second DL channel. That is, the first subscription of the UE may cancel the interferences caused by the second cell by reducing the first set of DL TBs (e.g., stored in the Rx buffer 610) by the reconstructed second DL channel. For example, at 718, the UE 702 may perform an interference cancelation for the first set of REs based at least in part on the second DL scheduling information. Furthermore, 918 may be performed by the inter-subscription DL interference cancelation component 198.

Figure 10:
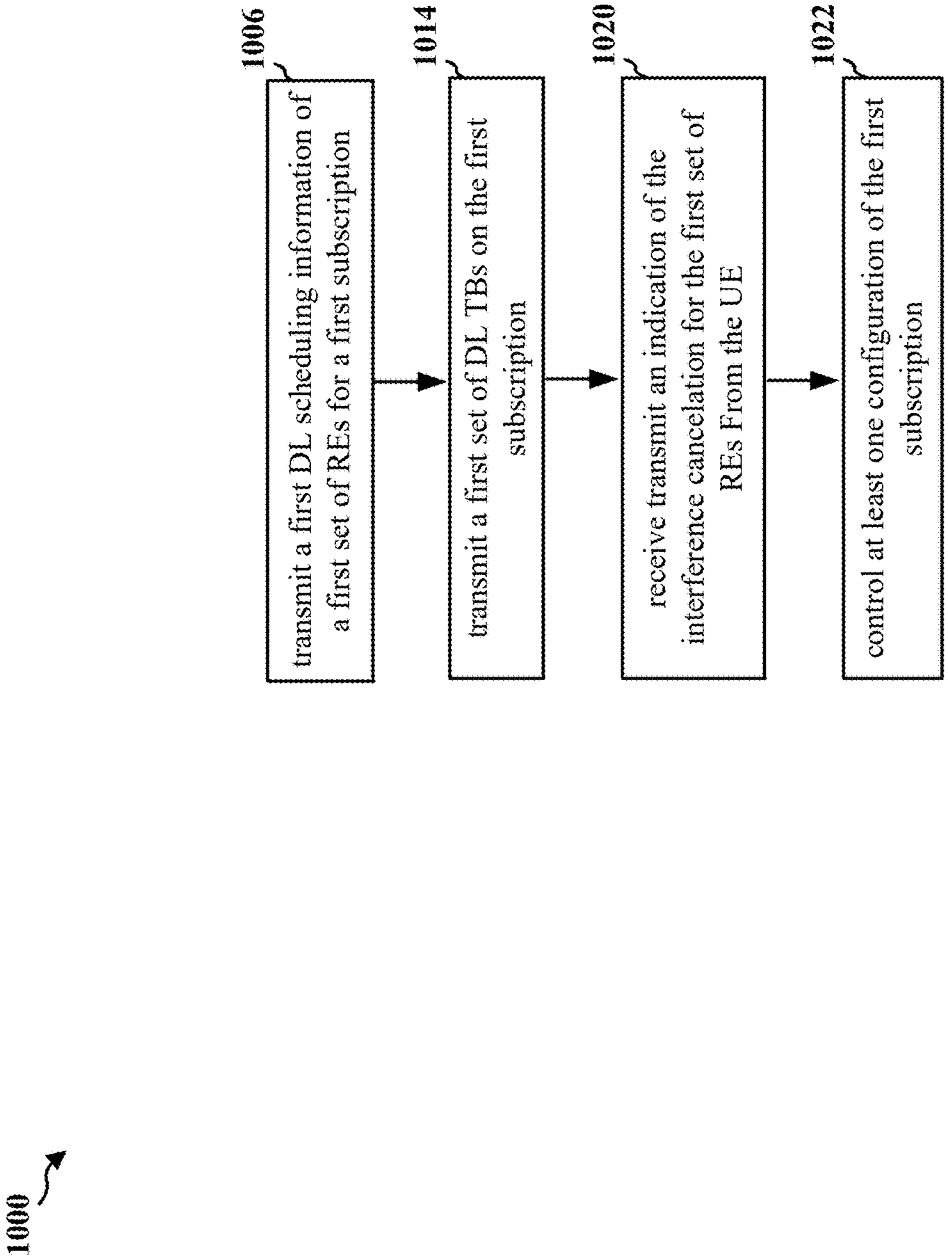
FIG. 10 is a flowchart of a method of wireless communication.

FIG. 10 is a flowchart 1000 of a method of wireless communication. The method may be performed by a network node (e.g., the base station 102; the first network node 703; the network node 1302/1460). A UE may be a DSDA device that may support concurrent network activities of two subscriptions including a first subscription (e.g., SUB-1) with the network node. The network node may receive an indication of an interference cancelation for the first set of REs that the network node transmitted to the UE, control at least one configuration of the first subscription (e.g., SUB-1).

At 1006, the network node may transmit first DL scheduling information of a first set of REs for a first subscription for a UE, the first subscription being included in a plurality of subscriptions between the UE and a network. Here, the network may include the network node (e.g., the first network node 703) and another network node (e.g., the second network node 704). In one aspect, the first subscription may be associated with an RRC connected state. For example, at 706, the first network node 703 may transmit first DL scheduling information of a first set of REs for a first subscription for a UE 702, the first subscription being included in a plurality of subscriptions between the UE 702 and a network. Furthermore, 1006 may be performed by a DL controlling component 199.

At 1014, the network node may transmit a first set of DL TBs for the UE on the first subscription. Here, the first set of DL TBs may carry the first set of REs for the first subscription. For example, at 714, the first network node 703 may transmit a first set of DL TBs for the UE 702 on the first subscription. Furthermore, 1014 may be performed by the DL controlling component 199.

At 1020, the network node may receive an indication of an interference cancelation performed for the first set of REs based at least in part on second DL scheduling information of a second set of REs for a second subscription received at the UE, at least a part of the first set of REs overlapping with the second set of REs. The UE may perform the interference cancelation for the first set of REs based on the second DL scheduling information of the second set of REs, and the UE may indicate the first network entity that the UE performed the interference cancelation for the first set of REs. In one aspect, the indication of the interference cancelation may indicate that at least a part of the first set of REs overlaps with the second set of REs. In another aspect, the indication of the interference cancelation may include at least a part of the second DL scheduling information of the second set of REs for the second subscription received at the UE, where the second DL scheduling information includes at least one of a second type, one or more second ports, a scrambling ID of the second RS resource, or a second set of time slots scheduled for the DL transmission on the first subscription. For example, at 720, the network node 703 may receive an indication of an interference cancelation performed for the first set of REs based at least in part on second DL scheduling information of a second set of REs for a second subscription received at the UE, at least a part of the first set of REs overlapping with the second set of REs. Furthermore, 1020 may be performed by the DL controlling component 199.

At 1022, the network node may control at least one configuration of the first subscription based on the indication of the interference cancelation performed for the first set of REs. That is, based on the indication of the interference cancelation for the first set of REs received from the UE, the network node may control or change the at least one configuration of the first subscription. In one aspect, the network node may control the at least one configuration of the first subscription to reduce the interference caused by the second set of TBs received on the second subscription of the UE. For example, at 722, the network node 703 may control at least one configuration of the first subscription based on the indication of the interference cancelation performed for the first set of REs. Furthermore, 1022 may be performed by the DL controlling component 199.

Figure 11:
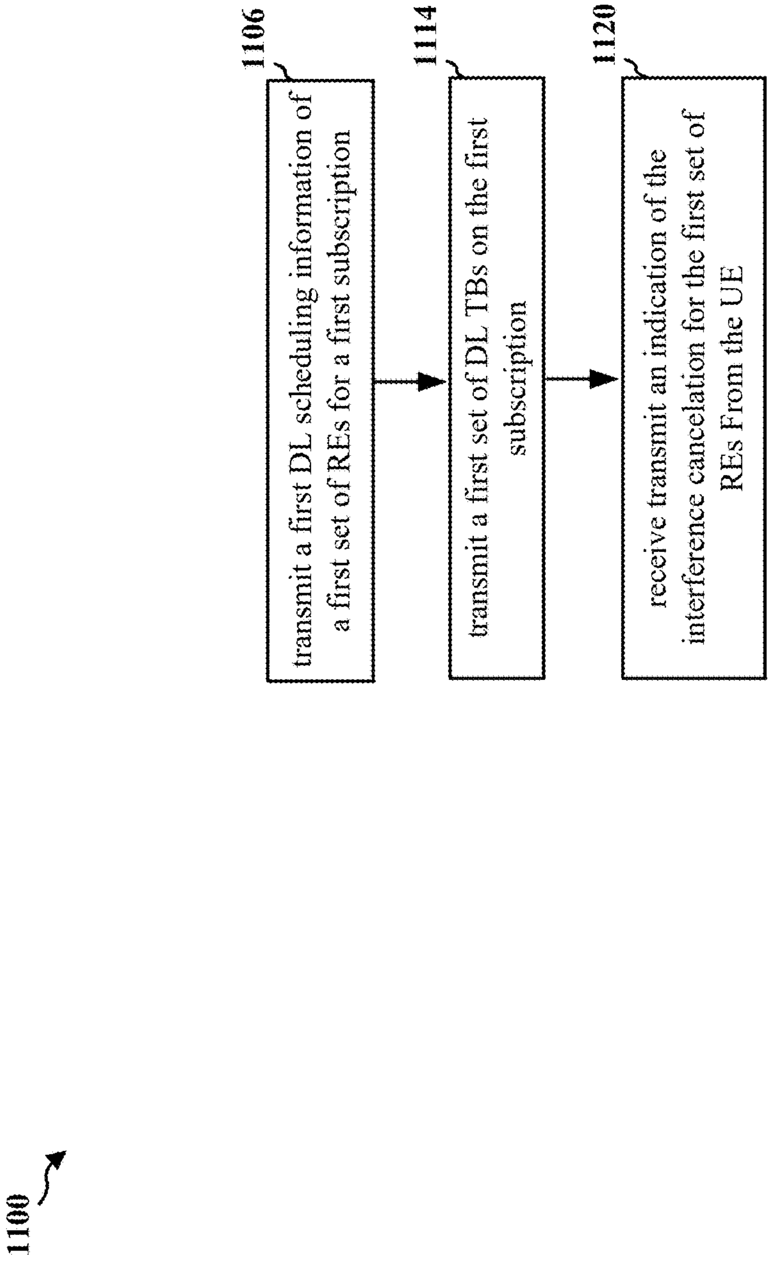
FIG. 11 is a flowchart of a method of wireless communication

FIG. 11 is a flowchart 1100 of a method of wireless communication. The method may be performed by a network node (e.g., the base station 102; the first network node 703; the network node 1302/1460). A UE may be a DSDA device that may support concurrent network activities of two subscriptions including a first subscription (e.g., SUB-1) with the network node. The network node may receive an indication of an interference cancelation for the first set of REs that the network node transmitted to the UE, control at least one configuration of the first subscription (e.g., SUB-1).

At 1106, the network node may transmit first DL scheduling information of a first set of REs for a first subscription for a UE, the first subscription being included in a plurality of subscriptions between the UE and a network. Here, the network may include the network node (e.g., the first network node 703) and another network node (e.g., the second network node 704). In one aspect, the first subscription may be associated with an RRC connected state. For example, at 706, the first network node 703 may transmit first DL scheduling information of a first set of REs for a first subscription for a UE 702, the first subscription being included in a plurality of subscriptions between the UE 702 and a network. Furthermore, 1106 may be performed by a DL controlling component 199.

At 1114, the network node may transmit a first set of DL TBs for the UE on the first subscription. Here, the first set of DL TBs may carry the first set of REs for the first subscription. For example, at 714, the first network node 703 may transmit a first set of DL TBs for the UE 702 on the first subscription. Furthermore, 1114 may be performed by the DL controlling component 199.

At 1120, the network node may receive an indication of an interference cancelation performed for the first set of REs based at least in part on second DL scheduling information of a second set of REs for a second subscription received at the UE, at least a part of the first set of REs overlapping with the second set of REs. The UE may perform the interference cancelation for the first set of REs based on the second DL scheduling information of the second set of REs, and the UE may indicate the first network entity that the UE performed the interference cancelation for the first set of REs. In one aspect, the indication of the interference cancelation may indicate that at least a part of the first set of REs overlaps with the second set of REs. In another aspect, the indication of the interference cancelation may include at least a part of the second DL scheduling information of the second set of REs for the second subscription received at the UE, where the second DL scheduling information includes at least one of a second type, one or more second ports, a scrambling ID of the second RS resource, or a second set of time slots scheduled for the DL transmission on the first subscription. For example, at 720, the network node 703 may receive an indication of an interference cancelation performed for the first set of REs based at least in part on second DL scheduling information of a second set of REs for a second subscription received at the UE, at least a part of the first set of REs overlapping with the second set of REs. Furthermore, 1120 may be performed by the DL controlling component 199.

Figure 12:
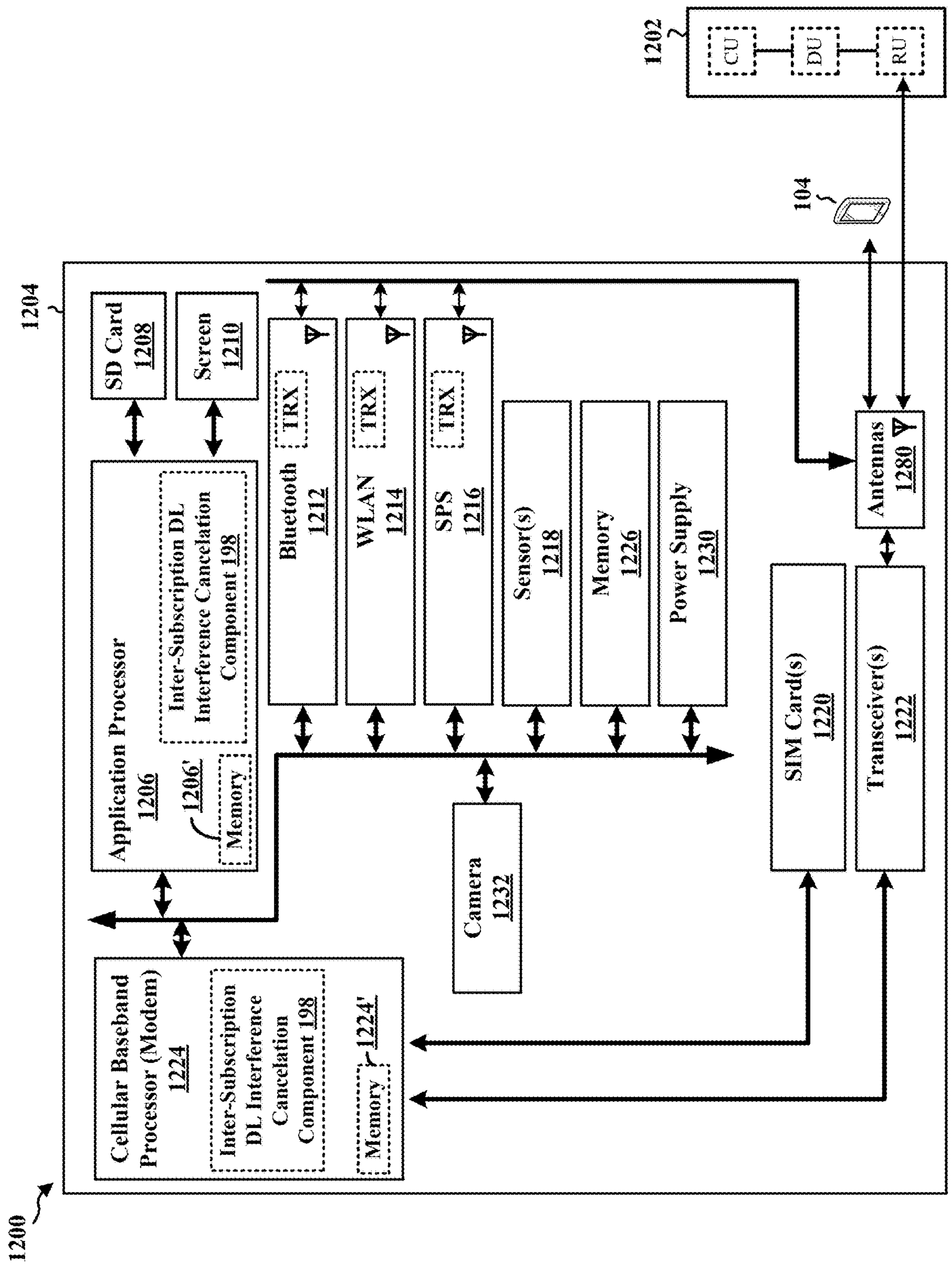
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the inter-subscription DL interference cancelation component 198 is configured to receive first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE and a network, and perform an interference cancelation for the first set of REs based at least in part on the second DL scheduling information. The inter-subscription DL interference cancelation component 198 may be within the cellular baseband processor 1224, the application processor 1206, or both the cellular baseband processor 1224 and the application processor 1206. The inter-subscription DL interference cancelation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE and a network, and means for performing an interference cancelation for the first set of REs based at least in part on the second DL scheduling information. In one configuration, the apparatus 1204, and in particular the cellular baseband processor 1224 and/or the application processor 1206, includes means for performing an overlapping detection based on the first DL scheduling information and the second DL scheduling information to detect that at least a portion of the first set of REs is overlapping with the second set of REs in a time domain or a frequency domain, where the interference cancelation is performed based on detecting that at least the portion of the first set of REs is overlapping with the second set of REs. In one configuration, the apparatus 1204, and in particular the cellular baseband processor 1224 and/or the application processor 1206, includes means for detecting that a first RS resource of the first set of REs overlaps with a second RS resource of the second set of REs, where the overlapping detection is performed based on detecting that the first RS resource overlaps with the second RS resource. In one configuration, the first DL scheduling information includes at least one of a first type, one or more first ports, a scrambling ID of the first RS resource, or a first set of time slots scheduled for a DL transmission on the first subscription, and the second DL scheduling information includes at least one of a second type, one or more second ports, a scrambling ID of the second RS resource, or a second set of time slots scheduled for the DL transmission on the first subscription. In one configuration, at least a portion of the first set of time slots overlaps in time with the second set of time slots, and the apparatus 1204, and in particular the cellular baseband processor 1224 and/or the application processor 1206, includes the means for performing the overlapping detection is further configured to detect one or more overlapped slots in which at least the portion of the first set of REs overlaps with the second set of REs, where the interference cancelation is performed based on the one or more overlapped slots. In one configuration, the apparatus 1204, and in particular the cellular baseband processor 1224 and/or the application processor 1206, includes means for determining that the first subscription is associated with a first RAT and the second subscription is associated with the first RAT, where the first RS resource overlapping with the second RS resource is detected based on determining that the first subscription is associated with the first RAT and the second subscription is associated with the first RAT. In one configuration, the apparatus 1204, and in particular the cellular baseband processor 1224 and/or the application processor 1206, includes means for receiving a first set of DL TBs on the first subscription and a second set of DL TBs on the second subscription, and reconstructing a second DL channel based on a decoded second set of DL TBs and a second RS resource received on the second subscription, where the interference cancelation for the first set of REs is performed on the first set of DL TBs based at least in part on the reconstructed second DL channel. In one configuration, where the first subscription and the second subscription are associated with a RRC connected state. In one configuration, where the first subscription and the second subscription are at a same physical location and the first subscription is camped at a first cell and the second subscription is camped at a second cell that is different from the first cell. The means may be the inter-subscription DL interference cancelation component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
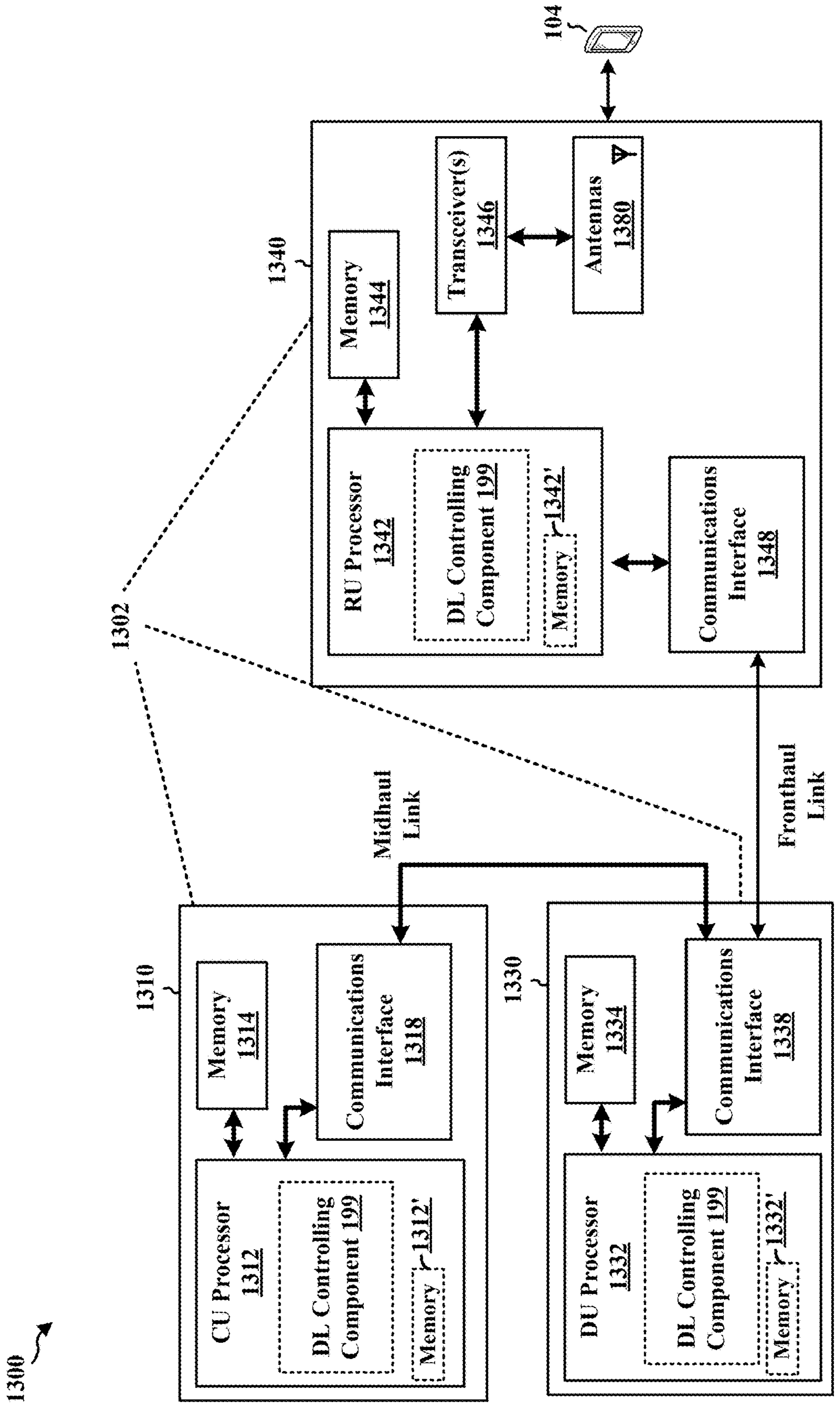
FIG. 13 is a diagram illustrating an example of a hardware implementation for an example apparatus and/or network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the DL controlling component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the DL controlling component 199 is configured to transmit first DL scheduling information of a first set of REs for a first subscription for a UE, the first subscription being included in a plurality of subscriptions between the UE and a network, transmit a first set of DL TBs for the UE on the first subscription, and receive an indication of an interference cancelation performed for the first set of REs based at least in part on second DL scheduling information of a second set of REs for a second subscription received at the UE, at least a part of the first set of REs overlapping with the second set of REs. The DL controlling component 199 may be within one or more processors of one or more of the CU 1310, DU 1330, and the RU 1340. The DL controlling component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting first DL scheduling information of a first set of REs for a first subscription for a UE, the first subscription being included in a plurality of subscriptions between the UE and a network. The network entity 1302 may further include means for transmitting a first set of DL TBs for the UE on the first subscription. The network entity 1302 may further include means for receiving an indication of an interference cancelation performed for the first set of REs based at least in part on second DL scheduling information of a second set of REs for a second subscription received at the UE, at least a part of the first set of REs overlapping with the second set of REs. In one configuration, the indication of the interference cancelation indicates that at least a part of the first set of REs overlaps with the second set of REs. In one configuration, the indication of the interference cancelation includes at least a part of the second DL scheduling information of the second set of REs for the second subscription received at the UE. In one configuration, the first DL scheduling information includes at least one of a first type, one or more first ports, a scrambling identifier (ID) of the first RS resource, or a first set of time slots scheduled for a DL transmission on the first subscription, and the second DL scheduling information includes at least one of a second type, one or more second ports, a scrambling ID of the second RS resource, or a second set of time slots scheduled for the DL transmission on the second subscription. In one configuration, the network entity 1302 further includes means for controlling at least one configuration of the first subscription based on the indication of the interference cancelation performed for the first set of REs. The means may be the DL controlling component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
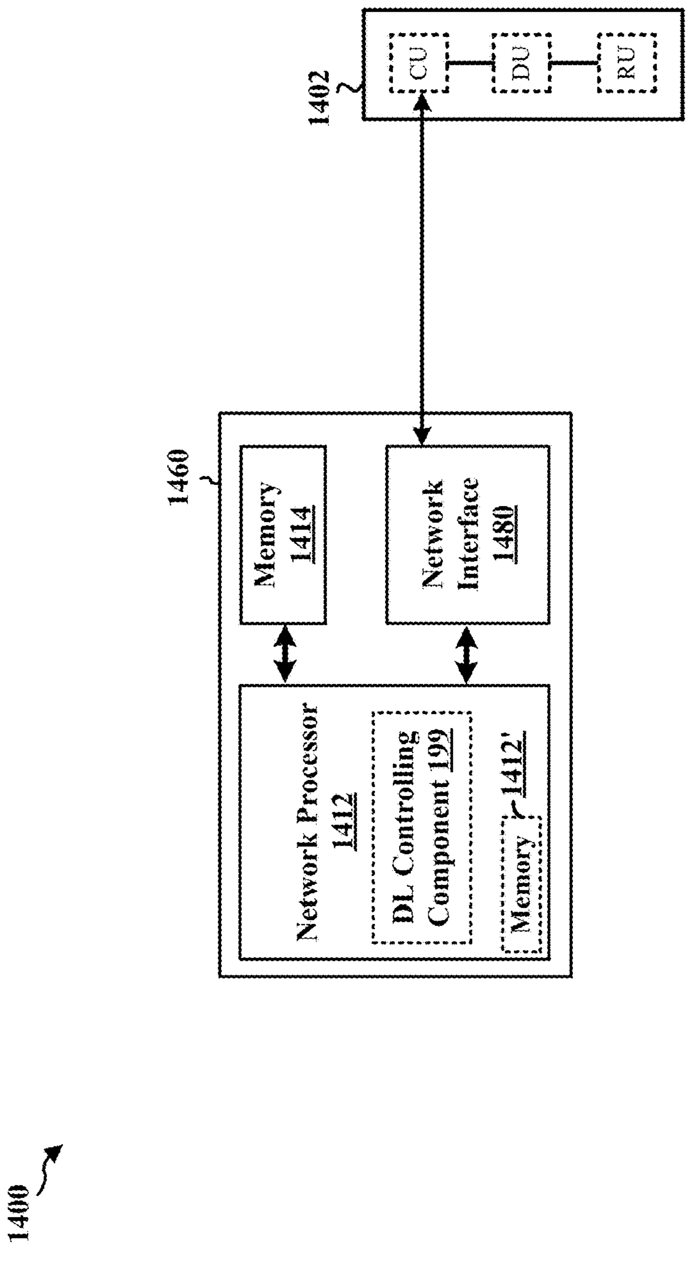
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the DL controlling component 199 is configured to transmit first DL scheduling information of a first set of REs for a first subscription for a UE, the first subscription being included in a plurality of subscriptions between the UE and a network, transmit a first set of DL TBs for the UE on the first subscription, and receive an indication of an interference cancelation performed for the first set of REs based at least in part on second DL scheduling information of a second set of REs for a second subscription received at the UE, at least a part of the first set of REs overlapping with the second set of REs. The DL controlling component 199 may be within the processor 1412. The DL controlling component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for transmitting first DL scheduling information of a first set of REs for a first subscription for a UE, the first subscription being included in a plurality of subscriptions between the UE and a network. The network entity 1460 may further include means for transmitting a first set of DL TBs for the UE on the first subscription. The network entity 1460 may further include means for receiving an indication of an interference cancelation performed for the first set of REs based at least in part on second DL scheduling information of a second set of REs for a second subscription received at the UE, at least a part of the first set of REs overlapping with the second set of REs. In one configuration, the indication of the interference cancelation indicates that at least a part of the first set of REs overlaps with the second set of REs. In one configuration, the indication of the interference cancelation includes at least a part of the second DL scheduling information of the second set of REs for the second subscription received at the UE. In one configuration, the first DL scheduling information includes at least one of a first type, one or more first ports, a scrambling identifier (ID) of the first RS resource, or a first set of time slots scheduled for a DL transmission on the first subscription, and the second DL scheduling information includes at least one of a second type, one or more second ports, a scrambling ID of the second RS resource, or a second set of time slots scheduled for the DL transmission on the second subscription. In one configuration, the network entity 1460 further includes means for controlling at least one configuration of the first subscription based on the indication of the interference cancelation performed for the first set of REs. The means may be the DL controlling component 199 of the network entity 1460 configured to perform the functions recited by the means.

According to the current disclosure, a UE supporting a DSDA mode may be configured to receive first DL scheduling information of a first set of resource elements REs for a first subscription and second DL scheduling information of a second set of REs for a second subscription, at least a part of the first set of REs overlapping with the second set of REs, the first subscription and the second subscription being included in a plurality of subscriptions between the UE and a network, and perform an interference cancelation for the first set of REs based at least in part on the second DL scheduling information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving first DL scheduling information of a first set of REs for a first subscription and second DL scheduling information of a second set of REs for a second subscription, at least a part of the first set of REs overlapping with the second set of REs, the first subscription and the second subscription being included in a plurality of subscriptions between the UE and a network, and performing an interference cancelation for the first set of REs based at least in part on the second DL scheduling information.

Aspect 2 is the method of aspect 1, further including performing an overlapping detection based on the first DL scheduling information and the second DL scheduling information to detect that at least a portion of the first set of REs is overlapping with the second set of REs in a time domain or a frequency domain, where the interference cancelation is performed based on detecting that at least the portion of the first set of REs is overlapping with the second set of REs.

Aspect 3 is the method of aspect 2, further including detecting that a first RS resource of the first set of REs overlaps with a second RS resource of the second set of REs, where the overlapping detection is performed based on detecting that the first RS resource overlaps with the second RS resource.

Aspect 4 is the method of aspect 3, where the first DL scheduling information includes at least one of a first type, one or more first ports, a scrambling ID of the first RS resource, or a first set of time slots scheduled for a DL transmission on the first subscription, where the second DL scheduling information includes at least one of a second type, one or more second ports, a scrambling ID of the second RS resource, or a second set of time slots scheduled for the DL transmission on the first subscription.

Aspect 5 is the method of aspect 4, where at least a portion of the first set of time slots overlaps in time with the second set of time slots, where performing the overlapping detection further including detecting one or more overlapped slots in which at least the portion of the first set of REs overlaps with the second set of REs, where the interference cancelation is performed based on the one or more overlapped slots.

Aspect 6 is the method of any of aspects 3 and 4, further including determining that the first subscription is associated with a first RAT and the second subscription is associated with the first RAT, where the first RS resource overlapping with the second RS resource is detected based on determining that the first subscription is associated with the first RAT and the second subscription is associated with the first RAT.

Aspect 7 is the method of any of aspects 1 to 6, further including receiving a first set of DL TBs on the first subscription and a second set of DL TBs on the second subscription, and reconstructing a second DL channel based on a decoded second set of DL TBs and a second RS resource received on the second subscription, where the interference cancelation for the first set of REs is performed on the first set of DL TBs based at least in part on the reconstructed second DL channel.

Aspect 8 is the method of any of aspects 1 to 7, where the first subscription and the second subscription are associated with a RRC connected state.

Aspect 9 is the method of any of aspects 1 to 8, the first subscription and the second subscription are at a same physical location and the first subscription is camped at a first cell and the second subscription is camped at a second cell that is different from the first cell.

Aspect 10 is the method of any of aspects 1 to 9, further including transmitting an indication of the interference cancelation for the first set of REs to a network entity in the network.

Aspect 11 is an apparatus for wireless communication including at least one processor coupled to a memory and configured to implement any of aspects 1 to 10, further including a transceiver coupled to the at least one processor.

Aspect 12 is an apparatus for wireless communication including means for implementing any of aspects 1 to 10.

Aspect 13 is a non-transitory computer-readable medium storing computer executable code, where the code when executed by a processor causes the processor to implement any of aspects 1 to 10.

Aspect 14 is a method of wireless communication at a network node, including transmitting first DL scheduling information of a first set of REs for a first subscription for a UE, the first subscription being included in a plurality of subscriptions between the UE and a network, transmitting a first set of DL TBs for the UE on the first subscription, and receiving an indication of an interference cancelation performed for the first set of REs based at least in part on second DL scheduling information of a second set of REs for a second subscription received at the UE, at least a part of the first set of REs overlapping with the second set of REs.

Aspect 15 is the method of aspect 14, where the indication of the interference cancelation indicates that at least a part of the first set of REs overlaps with the second set of REs.

Aspect 16 is the method of any of aspects 14 and 15, where the indication of the interference cancelation includes at least a part of the second DL scheduling information of the second set of REs for the second subscription received at the UE.

Aspect 17 is the method of any of aspects 14 to 16, where the first DL scheduling information includes at least one of a first type, one or more first ports, a scrambling identifier (ID) of a first RS resource, or a first set of time slots scheduled for a DL transmission on the first subscription, and the second DL scheduling information includes at least one of a second type, one or more second ports, a scrambling ID of a second RS resource, or a second set of time slots scheduled for the DL transmission on the first subscription.

Aspect 18 is the method of any of aspects 14 to 17, further including controlling at least one configuration of the first subscription based on the indication of the interference cancelation performed for the first set of REs.

Aspect 19 is an apparatus for wireless communication including at least one processor coupled to a memory and configured to implement any of aspects 14 to 18, further including a transceiver coupled to the at least one processor.

Aspect 20 is an apparatus for wireless communication including means for implementing any of aspects 14 to 18.

Aspect 21 is a non-transitory computer-readable medium storing computer executable code, where the code when executed by a processor causes the processor to implement any of aspects 14 to 18.

What is claimed is:

1. An apparatus for wireless communication at a user equipment (UE), comprising:

a memory; and at least one processor coupled to the memory and, based at least in part on information stored in the memory, the at least one processor is configured to:

receive first downlink (DL) scheduling information of a first set of resource elements (REs) for a first subscription and second DL scheduling information of a second set of REs for a second subscription, at least a part of the first set of REs overlapping with the second set of REs, the first subscription and the second subscription being included in a plurality of subscriptions between the UE and a network; and perform an interference cancelation for the first set of REs based at least in part on the second DL scheduling information.

2. The apparatus of claim 1, wherein the at least one processor is further configured to perform an overlapping detection based on the first DL scheduling information and the second DL scheduling information to detect that at least a portion of the first set of REs is overlapping with the second set of REs in a time domain or a frequency domain, wherein the interference cancelation is performed based on detecting that at least the portion of the first set of REs is overlapping with the second set of REs.

3. The apparatus of claim 2, wherein the at least one processor is further configured to detect that a first reference signal (RS) resource of the first set of REs overlaps with a second RS resource of the second set of REs, wherein the overlapping detection is performed based on detecting that the first RS resource overlaps with the second RS resource.

4. The apparatus of claim 3, wherein the first DL scheduling information includes at least one of a first type, one or more first ports, a scrambling identifier (ID) of the first RS resource, or a first set of time slots scheduled for a DL transmission on the first subscription, wherein the second DL scheduling information includes at least one of a second type, one or more second ports, a scrambling ID of the second RS resource, or a second set of time slots scheduled for the DL transmission on the second subscription.

5. The apparatus of claim 4, wherein at least a portion of the first set of time slots overlaps in time with the second set of time slots, and wherein, to perform the overlapping detection, the at least one processor is further configured to detect one or more overlapped slots in which at least the portion of the first set of REs overlaps with the second set of REs, wherein the interference cancelation is performed based on the one or more overlapped slots.

6. The apparatus of claim 3, wherein the at least one processor is further configured to determine that the first subscription is associated with a first radio access technology (RAT) and the second subscription is associated with the first RAT, wherein the first RS resource overlapping with the second RS resource is detected based on determining that the first subscription is associated with the first RAT and the second subscription is associated with the first RAT.

7. The apparatus of claim 1, wherein the at least one processor is further configured to:

receive a first set of DL transport blocks (TBs) on the first subscription and a second set of DL TBs on the second subscription; and reconstruct a second DL channel based on a decoded second set of DL TBs and a second RS resource received on the second subscription, wherein the interference cancelation for the first set of REs is performed on the first set of DL TBs based at least in part on the reconstructed second DL channel.

8. The apparatus of claim 1, further comprising a transceiver coupled to the at least one processor, wherein the first subscription and the second subscription are associated with a radio resource control (RRC) connected state.

9. The apparatus of claim 1, wherein the first subscription and the second subscription are at a same physical location and the first subscription is camped at a first cell and the second subscription is camped at a second cell that is different from the first cell.

10. The apparatus of claim 1, wherein the at least one processor is further configured to transmit an indication of the interference cancelation for the first set of REs to a network entity in the network.

11. A method of wireless communication at a user equipment (UE), comprising:

receiving first downlink (DL) scheduling information of a first set of resource elements (REs) for a first subscription and second DL scheduling information of a second set of REs for a second subscription, at least a part of the first set of REs overlapping with the second set of REs, the first subscription and the second subscription being included in a plurality of subscriptions between the UE and a network; and performing an interference cancelation for the first set of REs based at least in part on the second DL scheduling information.

12. The method of claim 11, further comprising:

performing an overlapping detection based on the first DL scheduling information and the second DL scheduling information to detect that at least a portion of the first set of REs is overlapping with the second set of REs in a time domain or a frequency domain, wherein the interference cancelation is performed based on detecting that at least the portion of the first set of REs is overlapping with the second set of REs.

13. The method of claim 12, further comprising:

detecting that a first reference signal (RS) resource of the first set of REs overlaps with a second RS resource of the second set of REs, wherein the overlapping detection is performed based on detecting that the first RS resource overlaps with the second RS resource.

14. The method of claim 13, wherein the first DL scheduling information includes at least one of a first type, one or more first ports, a scrambling identifier (ID) of the first RS resource, or a first set of time slots scheduled for a DL transmission on the first subscription, wherein the second DL scheduling information includes at least one of a second type, one or more second ports, a scrambling ID of the second RS resource, or a second set of time slots scheduled for the DL transmission on the second subscription.

15. The method of claim 14, wherein at least a portion of the first set of time slots overlaps in time with the second set of time slots, and wherein performing the overlapping detection further comprises: detecting one or more overlapped slots in which at least the portion of the first set of REs overlaps with the second set of REs, wherein the interference cancelation is performed based on the one or more overlapped slots.

16. The method of claim 13, further comprising:

determining that the first subscription is associated with a first radio access technology (RAT) and the second subscription is associated with the first RAT, wherein the first RS resource overlapping with the second RS resource is detected based on determining that the first subscription is associated with the first RAT and the second subscription is associated with the first RAT.

17. The method of claim 11, further comprising:

receiving a first set of DL transport blocks (TBs) on the first subscription and a second set of DL TBs on the second subscription; and reconstructing a second DL channel based on a decoded second set of DL TBs and a second RS resource received on the second subscription, wherein the interference cancelation for the first set of REs is performed on the first set of DL TBs based at least in part on the reconstructed second DL channel.

18. The method of claim 11, wherein the first subscription and the second subscription are associated with a radio resource control (RRC) connected state.

19. The method of claim 11, wherein the first subscription and the second subscription are at a same physical location and the first subscription is camped at a first cell and the second subscription is camped at a second cell that is different from the first cell.

20. The method of claim 11, further including transmitting an indication of the interference cancelation for the first set of REs to a network entity in the network.

21. An apparatus for wireless communication at a network node, comprising:

a memory; and at least one processor coupled to the memory and, based at least in part on information stored in the memory, the at least one processor is configured to:

transmit first downlink (DL) scheduling information of a first set of resource elements (REs) for a first subscription for a user equipment (UE), the first subscription being included in a plurality of subscriptions between the UE and a network;

transmit a first set of DL transport blocks (TBs) for the UE on the first subscription; and receive an indication of an interference cancelation performed for the first set of REs based at least in part on second DL scheduling information of a second set of REs for a second subscription received at the UE, at least a part of the first set of REs overlapping with the second set of REs.

22. The apparatus of claim 21, wherein the indication of the interference cancelation indicates that at least a part of the first set of REs overlaps with the second set of REs.

23. The apparatus of claim 21, wherein the indication of the interference cancelation includes at least a part of the second DL scheduling information of the second set of REs for the second subscription received at the UE.

24. The apparatus of claim 21, wherein the first DL scheduling information includes at least one of a first type, one or more first ports, a scrambling identifier (ID) of a first RS resource, or a first set of time slots scheduled for a DL transmission on the first subscription, wherein the second DL scheduling information includes at least one of a second type, one or more second ports, a scrambling ID of a second RS resource, or a second set of time slots scheduled for the DL transmission on the second subscription.

25. The apparatus of claim 21, wherein the at least one processor is further configured to control at least one configuration of the first subscription based on the indication of the interference cancelation performed for the first set of REs.

26. A method of wireless communication at a network node, comprising:

transmitting first downlink (DL) scheduling information of a first set of resource elements (REs) for a first subscription for a user equipment (UE), the first subscription being included in a plurality of subscriptions between the UE and a network;

transmitting a first set of DL transport blocks (TBs) for the UE on the first subscription; and receiving an indication of an interference cancelation performed for the first set of REs based at least in part on second DL scheduling information of a second set of REs for a second subscription received at the UE, at least a part of the first set of REs overlapping with the second set of REs.

27. The method of claim 26, wherein the indication of the interference cancelation indicates that at least a part of the first set of REs overlaps with the second set of REs.

28. The method of claim 26, wherein the indication of the interference cancelation includes at least a part of the second DL scheduling information of the second set of REs for the second subscription received at the UE.

29. The method of claim 26, wherein the first DL scheduling information includes at least one of a first type, one or more first ports, a scrambling identifier (ID) of a first RS resource, or a first set of time slots scheduled for a DL transmission on the first subscription, wherein the second DL scheduling information includes at least one of a second type, one or more second ports, a scrambling ID of a second RS resource, or a second set of time slots scheduled for the DL transmission on the second subscription.

30. The method of claim 26, further including:

controlling at least one configuration of the first subscription based on the indication of the interference cancelation performed for the first set of REs.

* * * * *